(12) United States Patent
Afshar et al.

(10) Patent No.: US 12,504,320 B2
(45) Date of Patent: Dec. 23, 2025

(54) SELF-ALIGNING OPTICAL ACOUSTIC SENSORS

(71) Applicant: The Board of Trustees of the Leland Stanford Junior University, Palo Alto, CA (US)

(72) Inventors: Behrad Habib Afshar, Stanford, CA (US); Michel J.F. Digonnet, Palo Alto, CA (US)

(73) Assignee: THE BOARD OF TRUSTEES OF THE LELAND STANFORD JUNIOR UNIVERSITY, Stanford, CA (US)

(*) Notice: Subject to any disclaimer, the term of this patent is extended or adjusted under 35 U.S.C. 154(b) by 340 days.

(21) Appl. No.: 18/186,039

(22) Filed: Mar. 17, 2023

(65) Prior Publication Data

US 2023/0314207 A1 Oct. 5, 2023

Related U.S. Application Data

(60) Provisional application No. 63/362,496, filed on Apr. 5, 2022.

(51) Int. Cl.
  *G01H 9/00* (2006.01)
  *G02B 6/42* (2006.01)

(52) U.S. Cl.
  CPC ........... *G01H 9/004* (2013.01); *G02B 6/4214* (2013.01); *G02B 6/423* (2013.01); *G02B 6/424* (2013.01); *G02B 6/4245* (2013.01)

(58) Field of Classification Search
  None
  See application file for complete search history.

(56) References Cited

U.S. PATENT DOCUMENTS

| 2,915,738 A | 12/1959 | Vogel |
| 3,831,137 A | 8/1974 | Cuomo |

(Continued)

FOREIGN PATENT DOCUMENTS

| CN | 108132093 A | 6/2018 |
| EP | 1380861 | 1/2004 |

(Continued)

OTHER PUBLICATIONS

Search Report received in European Application No. 23166875.7, dated Aug. 11, 2023, in 8 pages.

(Continued)

*Primary Examiner* — Jerry Rahll
(74) *Attorney, Agent, or Firm* — KATTEN MUCHIN ROSENMAN LLP

(57) ABSTRACT

An acoustic sensor includes at least one optical waveguide configured to emit an optical beam, a substantially planar first substrate optically coupled to the at least one optical waveguide, and a substantially planar second substrate substantially parallel to the first substrate, affixed to the first substrate, and affixed to the at least one optical waveguide. The first substrate is configured to be illuminated by the optical beam and to reflect at least a portion of the optical beam to the at least one optical waveguide. The first substrate includes a first substrate portion configured to reflect a first portion of the optical beam back to the at least one optical waveguide and a diaphragm configured to reflect a second portion of the optical beam back to the at least one optical waveguide. The diaphragm is responsive to a perturbation by moving relative to the first substrate portion. The optical beam is centered on a region between the first substrate portion and the diaphragm.

20 Claims, 13 Drawing Sheets

(56) References Cited

U.S. PATENT DOCUMENTS

| | | |
|---|---|---|
| 4,159,252 A | 6/1979 | Wainwright et al. |
| 4,446,543 A | 5/1984 | McLandrich et al. |
| 4,449,781 A | 5/1984 | Lightstone et al. |
| 4,519,252 A | 5/1985 | McMahon |
| 4,525,818 A | 6/1985 | Cielo et al. |
| 4,558,950 A | 12/1985 | Ulrich |
| 4,668,093 A | 5/1987 | Cahill |
| 4,682,500 A | 7/1987 | Uda |
| 4,705,354 A | 11/1987 | Ulrich |
| 4,911,516 A | 3/1990 | Palfrey et al. |
| 4,933,545 A | 6/1990 | Saaski et al. |
| 5,000,901 A | 3/1991 | Iyer et al. |
| 5,039,492 A | 8/1991 | Saaski et al. |
| 5,052,228 A | 10/1991 | Haritonidis |
| 5,280,173 A | 1/1994 | Morse et al. |
| 5,311,485 A | 5/1994 | Kuzmenko et al. |
| 5,488,504 A | 1/1996 | Worchesky et al. |
| 5,574,699 A | 11/1996 | Cuomo |
| 5,910,286 A | 6/1999 | Lipskier |
| 6,188,644 B1 | 2/2001 | Walsh |
| 6,281,976 B1 | 8/2001 | Taylor |
| 6,289,143 B1 | 9/2001 | Berthold et al. |
| 6,539,136 B1 | 3/2003 | Dianov et al. |
| 6,542,244 B1 | 4/2003 | Rumpf |
| 6,574,396 B1 | 6/2003 | Dragone |
| 6,717,707 B2 | 4/2004 | Clark |
| 6,768,590 B2 | 7/2004 | Steinberg et al. |
| 6,777,244 B2 | 8/2004 | Pepper et al. |
| 6,798,960 B2 | 9/2004 | Hamada |
| 6,807,342 B2 | 10/2004 | Fan |
| 6,822,784 B2 | 11/2004 | Fukshima et al. |
| 6,885,784 B2 | 4/2005 | Bohnert |
| 6,925,213 B2 | 8/2005 | Boyd et al. |
| 7,024,072 B2 | 4/2006 | Chen et al. |
| 7,054,011 B2 | 5/2006 | Zhu et al. |
| 7,134,343 B2 | 11/2006 | Suzuki et al. |
| 7,155,087 B2 | 12/2006 | Suh et al. |
| 7,173,713 B2 | 2/2007 | Xu et al. |
| 7,187,816 B2 | 3/2007 | Huang |
| 7,190,869 B2 | 3/2007 | Jin et al. |
| 7,193,725 B2 | 3/2007 | Brunfeld et al. |
| 7,194,906 B2 | 3/2007 | Mikado et al. |
| 7,224,465 B2 | 5/2007 | Balachandran et al. |
| 7,233,729 B2 | 6/2007 | Romagnoli et al. |
| 7,280,265 B2 | 10/2007 | Miles |
| 7,283,716 B2 | 10/2007 | Park et al. |
| 7,308,163 B2 | 12/2007 | Bratkovski et al. |
| 7,330,277 B2 | 2/2008 | Brunfeld et al. |
| 7,333,703 B2 | 2/2008 | Hatsuda et al. |
| 7,355,720 B1 | 4/2008 | Carr |
| 7,474,823 B2 | 1/2009 | Wang et al. |
| 7,483,144 B2 | 1/2009 | Sanders |
| 7,489,846 B2 | 2/2009 | Grot et al. |
| 7,526,148 B2 | 4/2009 | Kilic et al. |
| 7,545,513 B2 | 6/2009 | Kiesel et al. |
| 7,619,744 B2 | 11/2009 | Liess |
| 7,630,589 B2 | 12/2009 | Kilic et al. |
| 7,684,657 B2 | 3/2010 | Donlagic et al. |
| 7,751,055 B2 | 7/2010 | Sanders et al. |
| 7,809,219 B2 | 10/2010 | Kilic et al. |
| 7,881,565 B2 | 2/2011 | Kilic et al. |
| 7,940,400 B2 | 5/2011 | Lopushansky et al. |
| 7,944,567 B2 | 5/2011 | Asano |
| 7,966,887 B2 | 6/2011 | Knobloch et al. |
| 7,973,936 B2 | 7/2011 | Dantus |
| 8,094,519 B2 | 1/2012 | Lagakos |
| 8,139,227 B2 | 3/2012 | Kilic et al. |
| 8,160,406 B2 | 4/2012 | Kilic et al. |
| 8,249,400 B2 | 8/2012 | Kilic et al. |
| 8,331,741 B2 | 12/2012 | Kilic et al. |
| 8,537,368 B2 | 9/2013 | Kilic et al. |
| 8,542,956 B2 | 9/2013 | Akkaya et al. |
| 8,548,283 B2 | 10/2013 | Kilic et al. |
| 8,559,770 B2 | 10/2013 | Donlagic |
| 8,662,160 B2 | 3/2014 | DeWitt |
| 8,897,610 B2 | 11/2014 | Akkaya et al. |
| 10,495,508 B2 | 12/2019 | Digonnet et al. |
| 11,215,481 B2 | 1/2022 | Digonnet et al. |
| 11,629,979 B2 | 4/2023 | Digonnet et al. |
| 2002/0135863 A1 | 9/2002 | Fukshima et al. |
| 2002/0159671 A1 | 10/2002 | Boyd et al. |
| 2003/0059179 A1 | 3/2003 | Jiang et al. |
| 2003/0138185 A1 | 7/2003 | Dianov et al. |
| 2003/0165291 A1 | 9/2003 | Bhagavatula et al. |
| 2003/0174952 A1 | 9/2003 | Fan |
| 2004/0008934 A1 | 1/2004 | Takiguchi et al. |
| 2004/0080726 A1 | 4/2004 | Suh et al. |
| 2004/0196874 A1 | 10/2004 | Spiegelberg et al. |
| 2004/0208449 A1 | 10/2004 | Chen et al. |
| 2004/0228575 A1 | 11/2004 | Kim et al. |
| 2005/0052724 A1 | 3/2005 | Suzuki et al. |
| 2005/0062979 A1 | 3/2005 | Zhu et al. |
| 2005/0146726 A1 | 7/2005 | Balachandran et al. |
| 2005/0169590 A1 | 8/2005 | Alkeskjold |
| 2005/0175304 A1 | 8/2005 | Romagnoli et al. |
| 2005/0186117 A1 | 8/2005 | Uchiyama et al. |
| 2005/0191025 A1 | 9/2005 | Kim et al. |
| 2005/0200498 A1 | 9/2005 | Gleitman |
| 2005/0201660 A1 | 9/2005 | Grot et al. |
| 2005/0231728 A1 | 10/2005 | Wang et al. |
| 2005/0237602 A1 | 10/2005 | Yanagisawa |
| 2006/0024813 A1 | 2/2006 | Warthoe |
| 2006/0034559 A1 | 2/2006 | Arias Vidal et al. |
| 2006/0072875 A1 | 4/2006 | Bhagavatula et al. |
| 2006/0083472 A1 | 4/2006 | Sakai et al. |
| 2006/0133715 A1 | 6/2006 | Belleville et al. |
| 2006/0193550 A1 | 8/2006 | Wawro et al. |
| 2006/0227331 A1 | 10/2006 | Volmer et al. |
| 2006/0257067 A1 | 11/2006 | Bratkovski et al. |
| 2006/0280403 A1 | 12/2006 | Suh et al. |
| 2007/0081165 A1 | 4/2007 | Kilic et al. |
| 2007/0277974 A1 | 12/2007 | Difoggio |
| 2008/0034866 A1 | 2/2008 | Kilic et al. |
| 2008/0089645 A1 | 4/2008 | Wang et al. |
| 2009/0028407 A1 | 1/2009 | Seibel et al. |
| 2009/0202195 A1 | 8/2009 | Lagakos et al. |
| 2009/0208163 A1 | 8/2009 | Kilic et al. |
| 2010/0007893 A1 | 1/2010 | Hall |
| 2010/0092125 A1 | 4/2010 | Kilic et al. |
| 2010/0199773 A1 | 8/2010 | Zhou |
| 2010/0242628 A1 | 9/2010 | Knobloch et al. |
| 2011/0041616 A1 | 2/2011 | Kilic et al. |
| 2011/0268384 A1* | 11/2011 | Akkaya ............... G02B 6/32 385/12 |
| 2012/0116255 A1 | 5/2012 | Wang et al. |
| 2012/0182557 A1 | 7/2012 | Kilic et al. |
| 2015/0308864 A1 | 10/2015 | Paulsson et al. |
| 2015/0330830 A1 | 11/2015 | Akkaya et al. |
| 2019/0094066 A1* | 3/2019 | Digonnet ............. G02B 6/32 |
| 2019/0293458 A1 | 9/2019 | Digonnet et al. |

FOREIGN PATENT DOCUMENTS

| | | |
|---|---|---|
| EP | 2434319 | 3/2012 |
| EP | 3059562 A1 | 8/2016 |
| GB | 1 558 689 | 1/1980 |
| JP | 56-081802 | 7/1981 |
| JP | 58-004322 | 1/1983 |
| JP | 59-155526 | 9/1984 |
| JP | 61-056598 | 3/1986 |
| JP | 03-160774 | 7/1991 |
| JP | 06-052073 | 2/1994 |
| JP | 2002-328243 | 11/2002 |
| JP | 2003-130722 | 5/2003 |
| JP | 2003-185864 | 7/2003 |
| JP | 2005-045463 | 2/2005 |
| JP | 2005-077711 | 3/2005 |
| JP | 2007-298368 | 11/2007 |
| JP | 2008-541513 | 11/2008 |
| JP | 2009-535977 | 10/2009 |
| JP | 2010-516124 | 5/2010 |
| JP | 5491857 | 3/2014 |
| WO | WO 01/01090 A1 | 1/2001 |
| WO | WO 2006/092052 | 9/2006 |

(56) References Cited

FOREIGN PATENT DOCUMENTS

| WO | WO 2006/119200 | 11/2006 |
|---|---|---|
| WO | WO 2007/130152 | 11/2007 |
| WO | WO 2008/086448 | 7/2008 |
| WO | WO 2011/115933 | 9/2011 |

OTHER PUBLICATIONS

Ackemann et al., "The Gouy phase shift, the average phase lag of Fourier components of Hermite-Gaussian modes and their application to resonance conditions in optical cavities," Opt. Commun., vol. 189, pp. 5-14, 2001.
Afshar et al., "Lens-less, Spring-Loaded Diaphragm-Based Fiber Acoustic Sensor," 26th International Conference on Optical Fiber Sensors OSA Tech Digest (Optical Soc of America, 2018), paper WD6.
Afshar et al. "Spring-loaded diaphragm-based fiber acoustic sensor," J. of Lightwave Technol., vol. 45, No. 14, 3933-3936 (2020).
Akkaya et al., "Modeling and Demonstration of Thermally Stable High-Sensitivity Reproducible Acoustic Sensors," Journal of Microelectromechanical Systems, vol. 21, No. 6, Dec. 2012, pp. 1347-1356.
Akulichev et al., "Acoustic cavitation thresholds of sea water in different regions of the world ocean," Acoust. Phys. vol. 51, No. 2, 128-138, 2005.
Andrews et al., "A comparison of squeeze-film theory with measurements on a microstructure," Sensors and Actuators A, vol. 36, pp. 79-87, 1993.
Arya et al., "Exact Analysis of the Extrinsic Fabry-Perot Interferometric Optical Fiber Sensor Using Kirchhoff's Diffraction Formalism," Opt. Fiber Technol., vol. 1, pp. 380-384, 1995.
Astratov et al., "Resonant coupling of near-infrared radiation to photonic band structure waveguides," J. Lightwave Technol., vol. 17, No. 11, 2050-57, 1999.
Baba, K., "Theoretical characteristics of optical polarizing films using oblique metal island films," Proceedings of SPIE, vol. 6116, 611605-1, 2006.
Bao et al., "Squeeze film air damping in MEMS," Sens. Actuator A Phys., vol. 136, No. 1, 3-27 (2007).
Beard et al., "Optical fiber photoacoustic-photothermal probe," Optics Letters, vol. 23, No. 15, Aug. 1, 1998, pp. 1235-1237.
Belleville et al., "White-light interferometric multimode fiber-optic strain sensor," Opt. Lett., vol. 18, No. 1, pp. 78-80, Jan. 1, 1993.
Bergqvist, J., "Finite-element modelling and characterization of a silicon condenser microphone with a highly perforated backplate," Sensors and Actuators A 39, 191-200, 1993.
Bernstein et al., "Low-noise MEMS vibration sensor for geophysical applications," J. Microelectromech. Syst., vol. 8, No. 4, 433-438 (1999).
Bing Yu et al., "Fiber Fabry-Perot sensors for detection of partial discharges in power transformers," Applied Optics Optical Society of America, vol. 42, No. 16, Jun. 1, 2003, pp. 3241-3250.
Blom et al., "Dependence of the quality factor of micromachined silicon beam resonators on pressure and geometry," J. Vac. Sci. Technol. B, vol. 10, No. 1, 19-26 (1992).
BrüeL & KjÆr, "Type 4179," www.bksv.com/Products/transducers/ acoustic/ microphones/ microphone-cartridges/4179, downloaded from the internet on Apr. 26, 2016.
Bucaro et al., "Fiber-optic hydrophone," J. Acoust. Soc. Am. vol. 62, No. 5, 1302-04, Nov. 1977.
Bucaro et al., "Miniature, High Performance, Low-Cost Fiber Optic Microphone," J. Acoust. Soc. Am., vol. 118, No. 3, Part 1, pp. 1406-1413, Sep. 2005.
Callen et al., "Irreversibility and generalized noise," Phys. Rev. vol. 83, No. 1, 34-40, Jul. 1, 1951.
Chen et al., "High performance chitosan diaphragm-based fiber-optic acoustic sensor," Sensors and Actuators A: Physical, vol. 163, No. 1, Jun. 30, 2010, pp. 42-47.

Chin et al., "Fabry-Perot diaphragm fiber-optic sensor," Appl. Opt., vol. 46, No. 31, pp. 7614-7619, Nov. 2007.
Chow et al., "Ultra Resolution Fiber Sensor Using a Pre-stabilized Diode Laser," Post-deadline CLEO 2005, CPDA9, three pages.
Cibula et al., "Miniature fiber-optic pressure sensor with a polymer diaphragm," Appl. Opt., vol. 44, No. 14, 2736-2744, 2005.
Cole et al., "Fiber-optic detection of sound," J. Acoust. Soc. Am. vol. 62, 1136-38, Nov. 1977.
Crane, P.H.G., "Method for the calculation of the acoustic radiation impedance of unbaffled and partially baffled piston sources," J. Sound Vib. vol. 5, No. 2, 257-277, 1967.
Daley et al., "Field testing of fiber-optic distributed acoustic sensing (DAS) for subsurface seismic monitoring," The Leading Edge, vol. 32, No. 6, pp. 699-706, 2013.
Dorn et al., "Sharper focus for a radially polarized light beam," Phys. Rev. Lett., vol. 91, No. 23, 233901-1-233901-4, Dec. 5, 2003.
Eaton et al., "A new analytical solution for diaphragm deflection and its application to a surface micromachined pressure sensor," Int'l. Conf. on Modeling and Simulation of Microsystems, 1999.
Fan et al., "Analysis of guided resonances in photonic crystal slabs," Phys. Rev. B, vol. 65, p. 235112-1-235112-8, 2002.
Fine et al., "Compressibility of water as a function of temperature and pressure," J. Chem. Phys. 59, No. 10, 5529-5536, Nov. 15, 1973.
Furstenau et al., "Extrinsic Fabry-Perot interferometer vibration and acoustic sensor systems for airport ground traffic monitoring," IEE Proc. Optoelectron., vol. 144, No. 3, pp. 134-144, Jun. 1997.
Gabrielson, T.B., "Mechanical-thermal noise in micromachined acoustic and vibration sensors," IEEE Trans. Electron Devices vol. 40, No. 5, 903-909, May 1993.
Gagliardi et al., "Design and test of a laser-based optical-fiber Bragg-grating accelerometer for seismic applications," Measurement Science and Technology, vol. 19, No. 8, Jul. 21, 2008, 8 pgs.
Gander et al., "Embedded Micromachined Fiber Optic Fabry-Perot Pressure Sensors in Aerodynamics Applications," Sensors Journal, IEEE, vol. 1, No., 2003, pp. 1707-1712.
Gangopadhyay et al., "Modeling and Analysis of an Extrinsic Fabry-Perot Interferometer Cavity," Appl. Optics, vol. 44, No. 16, pp. 3192-3196, Jun. 1, 2005.
Giles et al., "A silicon MEMS optical switch attenuator and its use in lightwave subsystems," IEEE J. Sel. Topics in Quant. Electr., vol. 5, No. 1,18-25 (1999).
Greywall, D.S., "Micromachined optical-interference microphone," Sensors Actuators A Phys., vol. 75, 257-268, 1999.
Guggenheim et al., "Ultrasensitive plano-concave optical microresonators for ultrasound sensing," Nature Photonics, vol. 11, No. 11, pp. 714-719, 2017.
Haakestad et al., "Acousto-Optic Properties of Photonic Crystal Fibers," 2004 IEEE Ultrasonics Symposium, pp. 56-59, 2004.
Han et al., "Exact analysis of low-finesse multimode fiber extrinsic Fabry-Perot interferometers," Appl. Opt., vol. 43, No. 24, pp. 4659-4666, Aug. 20, 2004.
Hemenway et al., "All-silicon integrated optical modulator for 1.3 μm fiber-optic interconnects," Applied Physics Letters vol. 55, No. 4, Jul. 24, 1989, pp. 349-350.
Hill et al., "Fiber-Optic Hydrophone Array for Acoustic Surveillance in the Littoral," International Society for Optics and Photonics, vol. 5780, 2005, pp. 1-10.
Hirsekorn et al., "Modelling and simulation of acoustic wave propagation in locally resonant sonic materials, www.sciencedirect.com," Ultrasonics 42, pp. 231-235, 2004.
Holden, J., "Multiple-beam interferometry: intensity distribution in the reflected system," Proc. Phys. Soc. B, vol. 62, Part 7, pp. 405-417, Jul. 1, 1949.
Homentcovschi et al., "Modeling of Viscous Damping of Perforated Planar Microstructures. Applications in Acoustics," Journal of the Acoustical Society of America, vol. 116, No. 5, 2939-2947, Nov. 2004.
Homentcovschi et al., "Viscous damping of perforated planar micromechanical structures," Sensors and Actuators A 119, 544-552, 2005.

(56) References Cited

OTHER PUBLICATIONS

Hu et al., "Influence of three-dimensional roughness on pressure-driven flow through microchannels," J. Fluids Eng. 125, 871-879, Sep. 2003.
Jo et al., "Miniature fiber acoustic sensors using a photonic-crystal membrane," Optical Fiber Technology, vol. 19, No. 6, Aug. 28, 2013, pp. 785-792.
Jo et al., "Piconewton force measurement using a nanometric photonic crystal diaphragm," Optics Letters, vol. 39, No. 15, Aug. 1, 2014, pp. 4533-4536.
Jo et al., "Ultra-sensitive acoustic fiber sensors utilizing nano-membranes," Proc. SPIE 9634, 24th International Conference on Optical Fibre Sensors, 96341P (Sep. 28, 2015).
Jo et al., "Highly Sensitive Phase-Front-Modulation Fiber Acoustic Sensor," Journal of Lightwave Technology, vol. 22, No. 20, Oct. 15, 2015, pp. 4377-4383.
Kadirvel et al., "Design and Characterization of MEMS Optical Microphone for Aeroacoustic Measurement," 42nd AIAA Aerospace Science Meeting and Exhibit, Jan. 5-8, 2004, Reno, Nevada.
Kageyama et al., "Acoustic emission monitoring of a reinforced concrete structure by applying new fiber-optic sensors," Smart Mater. Struct., vol. 14, No. 3, pp. S52-S59, 2005.
Kalvesten et al., "The first surface micromachined pressure sensor for cardiovascular pressure measurements," Proc. MEMS 98. IEEE, Eleventh Ann. Int'l Workshop on Micro Electro Mech. Sys., An Investigation of Micro Structures, Sensors, Actuators, Machines and Systems, Cat. No. 98CH36176, 574-579 (1998).
Kanskar et al., "Observation of leaky slab modes in an air-bridged semiconductor waveguide with a two-dimensional photonic lattice," Appl. Phys. Lett., vol. 70, No. 11, p. 1438-40, Mar. 1997.
Karathanos, V., "Inactive Frequency Bands In Photonic Crystals," Journal of Modern Optics, vol. 45, No. 8, pp. 1751-1758, 1998.
Kersey et al., "Fiber grating sensors", J. Lightwave Tehnol., vol. 15, No. 8, p. 1442-62, Aug. 1997.
Kersey, A.D., "Optical fiber sensors for permanent downwell monitoring applications in the oil and gas industry," IEICE Trans. on Electronics, vol. E83-C, No. 3, 400-404, 2000.
Kilic et al., "Miniature photonic-crystal hydrophone optimized for ocean acoustics," The Journal of the Acoustical Society of America, vol. 129, No. 4, 2011, pp. 1837-1850.
Kilic et al., "Analysis of guided-resonance-based polarization beam splitting in photonic-crystal slabs," J. Opt. Soc. Am. A, vol. 25, No. 11, pp. 2680-2692, Nov. 2008.
Kilic et al., "Asymmetrical spectral response in fiber Fabry-Perot interferometers," J. Lightwave Technol. 28, 8 pages, 2009.
Kilic et al., "External fiber Fabry-Perot acoustic sensor based on photonic-crystal mirror," in 18th International Optical Fiber Sensors Conference, Cancun, Mexico, 2006; published in Measurement Science and Technology (2007) vol. 18, pp. 3049-3054.
Kilic et al., "Fiber-optical acoustic sensor based on a photonic-crystal diaphragm," in 15th International Conference on Solid-State Sensors, Actuators, and Microsystems, Denver, CO, Jun. 21-25, 2009.
Kilic et al., "Photonic crystal slabs demonstrating strong broadband suppression of transmission in the presence of disorders," Opt. Lett. vol. 29, No. 23, 2782-2784, Dec. 1, 2004.
Kilic et al., "Photonic-crystal-diaphragm-based fiber-tip hydrophone optimized for ocean acoustics," in 19th International Optical Fiber Sensors Conference, Perth, Australia, 2008.
Kim et al., "Micromachined Fabry-Perot cavity pressure transducer," IEEE Photon. Technol. Lett., vol. 7, No. 12, pp. 1471-1473, Dec. 1995.
Kim et al., "Single-film broadband photonic crystal micro-mirror with large angular range and low polarization dependence," in Conference on Lasers and Electro-Optics (CLEO), Baltimore, MD, CThP7, 2007.
Kuhnel et al., "A silicon condenser microphone with structured back plate and silicon nitride membrane," Sensors and Actuators A, vol. 30, 251-258, 1992.
Kuzmenko, P.J., "Experimental Performance of a Miniature Fabry-Perot Fiber Optic Hydrophone," Proceedings of 8th Optical Fiber Sensors Conference, Monterey, California, Jan. 29-31, 1992, pp. 354-357.
Ladabaum et al., "Surface micromachined capacitive ultrasonic transducers, Ultrasonics, Ferroelectrics and Frequency Control," IEEE Transactions, vol. 45, No. 3, pp. 678-690, May 1998.
Lee et al., "Fiber-optic Fabry-Perot temperature sensor using a low-coherence light source," J. Lightwave Technol., vol. 9, No. 1, pp. 129-134, Jan. 1991.
Lee et al., "Interferometric optical fibre sensors using internal mirrors," Electron. Lett., vol. 24, No. 4, pp. 193-194, Feb. 18, 1988.
Levy et al., "Engineering space-variant inhomogeneous media for polarization control," Opt. Lett., vol. 29, No. 15, 1718-20, Aug. 1, 2004.
Lima et al., "Intrinsic and extrinsic fiber Fabry-Perot sensors for acoustic detection in liquids," Microwave and Optical Technology Letters, vol. 52, No. 5, May 2010, pp. 1129-1134.
Loh et al., "The potential of MEMS for advancing experiments and modeling in cell mechanics," Exp. Mech., vol. 49, No. 1, 105-124 (2009).
Majumder et al., "Fibre Bragg gratings in structural health monitoring-Present status and applications," Sensors and Actuators A: Physical, vol. 147, 2008, pp. 150-164.
Mala et al., "Flow characteristics of water in microtubes," Int. J. Heat Fluid Flow 20, 142-148, 1999.
Marcuse et al., "Coupling efficiency of front surface and multilayer mirrors as fiber-end reflectors," J. Lightwave Technol., vol. LT-4, No. 4, pp. 377-381, 1986.
Marcuse, D., "Loss analysis of single-mode fiber splices," Bell Syst. Tech. J., vol. 56, No. 5, pp. 703-718, May-Jun. 1977.
Marin et al., Acoustic modes of a dual-core square-lattice photonic crystal fiber preform, Proc. 27th Eur. Conf. on Opt. Comm. (ECOC'01—Amsterdam), pp. 518-519, 2001.
Mellen, R.H., "The thermal-noise limit in the detection of underwater acoustic signals," J. Acoust. Soc. Am. vol. 24, No. 5, 478-480, Sep. 1952.
Mellow et al., "On the sound field of an oscillating disk in a finite open and closed circular baffle," J. Acoust. Soc. Am. vol. 118, No. 3, Pt. 1, 1311-1325, Sep. 2005.
Morey et al., "Multiplexing fiber Bragg grating sensors," Fiber and Integrated Optics, vol. 10, pp. 351-360, 1991.
Morris, P., "A Fabry-Perot fiber-optic ultrasound hydrophone for simultaneous measurement of temperature and acoustic pressure," J. of Acoust. Soc. of Am., vol. 125, No. 6, pp. 3611-3622, 2009.
Murphy et al., "Quadrature phase-shifted, extrinsic Fabry-Perot optical fiber sensors," Opt. Lett., vol. 16, No. 4, pp. 273-275, Feb. 15, 1991.
Nessaiver et al., "Recording High Quality Speech During Tagged Cine-MRI Studies Using a Fiber Optic Microphone," Journal of Magnetic Resonance Imaging, vol. 23, No. 783, 2006, pp. 92-97.
Ochiai et al., "Dispersion relation and optical transmittance of a hexagonal photonic crystal slab," Phys. Rev. B, vol. 63, p. 125107-1-125107-7, 2001.
Pacradouni et al., "Photonic band structure of dielectric membranes periodically textured in two dimensions," Phys. Rev. B, vol. 62, No. 7, p. 4204-07, Aug. 15, 2000.
Paddon et al., "Two-dimensional vector-coupled-mode theory for textured planar waveguides," Phys. Rev. B, vol. 61, No. 3, p. 2090-2101, Jan. 15, 2000.
Pedersen et al., "On the mechanical behaviour of thin perforated plates and their application in silicon condenser microphones," Sens. Actuators A, vol. 54, 499-504, 1996.
Petuchowski et al., "A sensitive fiber-optic Fabry-Perot interferometer," IEEE J. Quantum Electron., vol. 17, No. 11, pp. 2168-2170, Nov. 1981.
Rands et al., "Characterization of transition to turbulence in microchannels," Int. J. Heat Mass Transfer 49, 2924-2930, 2006.
Roylance et al., "A batch-fabricated silicon accelerometer," IEEE Trans. Electron Devices, vol. 26, No. 12, 1911-1917 (1979).
Rugar et al., "Improved fiber-optic interferometer for atomic force microscopy," Applied Physics Letters, vol. 55, No. 25, Dec. 18, 1989 pp. 2588-2590.

(56) References Cited

OTHER PUBLICATIONS

Saulson, "Thermal noise in mechanical experiments," Phys. Rev. D, vol. 42, No. 8, 2437-2445 (1990).
Sharp et al., "Transition from laminar to turbulent flow in liquid filled microtubes," Exp. Fluids 36, 741-747, 2004.
Sharpe et al., "Effect of specimen size on Young's modulus and fracture strength of polysilicon," J. Micromech. Syst. vol. 10, No. 3, 317-326, Sep. 2001.
Škvor, "On acoustical resistance due to viscous losses in the air gap of electrostatic transducers," Acustica, vol. 19, 295-299, 1967-1968.
Spillman, Jr., et al., "Moving Fiber-Optic Hydrophone," Optics Lett., vol. 5, No. 1, pp. 30-31, Jan. 1980.
Starr, J.B., "Squeeze-film damping in solid-state accelerometers," in IEEE Workshop in Solid-State Sensor and Actuator 4th Technical Digest, pp. 44-47, 1990.
Suh et al., "Mechanically switchable photonic crystal structures based on coupled photonic crystal slabs", SPIE, Jul. 9, 2004, Photonic Crystal Materials and Devices II, Jan. 26-29, 2004, San Jose, CA USA, pp. 299-306, vol. 5360, No. 1.
Suh et al., "Displacement-sensitive photonic crystal structures based on guided resonance in photonic crystal slabs," Appl. Phys. Lett., vol. 82, No. 13, pp. 1999-2001, Mar. 31, 2003.
Szymanski et al., "Killer whale (*Orcinus orca*) hearing: Auditory brainstem response and behavioral audiograms," J. Acoust. Soc. Am. vol. 106, No. 2, 1134-1141, Aug. 1999.
Teledyne Reason, "TC4032," http://www.teledyne-reson.com/hydrophones/tc-4032/, 2005.
Thomson et al., "A Fabry-Perot acoustic sensor vibration detector-application to acoustic holography," J. Phys. D.: Appl. Phys., vol. 6, p. 677, 1973.
Timoshenko et al., "Theory of Plates and Shells," McGraw-Hill, 1959.
Totsu et al., "Ultra-Miniature Fiber-Optic Pressure Sensor Using White Light Interferometry," J. Micromech. Microeng., vol. 15, pp. 71-75, 2005.
Tsau et al., "Characterization of wafer-level thermocompression bonds," J. Microelectromech. Syst., vol. 13, No. 6, 963-971 (2004).
Tufte et al., "Silicon diffused-element piezoresistive diaphragms," J. Appl. Phys., vol. 33, No. 1, 3322-3327 (1962).
Van Kessel et al., "A MEMS-based projection display," Proc. IEEE, vol. 86, No. 8, 1687-1704 (1998).
Wang et al., "Fiber-optic chemical sensors and biosensors (2008-2012)," Analytical chemistry, vol. 85, No. 2, Nov. 9, 2012, pp. 487-508.
Wang et al., "Miniature all-silica optical fiber pressure sensor with an ultrathin uniform diaphragm.," Optics Express, vol. 18, No. 9, Apr. 26, 2010, pp. 9006-9014.
Wang et al., "Optical pressure/acoustic sensor with precise Fabry-Perot cavity length control using angle polished fiber," Opt. Express, vol. 17, No. 19, 16613-16618, 2009.
Wenz, G.M., "Acoustic ambient noise in the ocean: Spectra and sources," J. Acoust. Soc. Am. vol. 34, No. 12, 1936-1956, Dec. 1962.
Worth, R.A., "Accuracy of the parallel-plate analogy for representation of viscous flow between coaxial cylinders," J. Appl. Polym. Sci. 24, 319-328, 1979.
Wu et al., "Single-crystal silicon photonic-crystal fiber-tip pressure sensors," J. Microelectromechanical Syst., vol. 24, No. 4, 968-975, 2015.
Xu et al., "Fiber-optic acoustic pressure sensor based on large-area nanolayer silver diaphragm," Optics Letter, vol. 39, No. 10, May 15, 2014, pp. 2838-2840.
Xu et al., "High-sensitivity Fabry-Perot interferometric pressure sensor based on a nanothick silver diaphragm," Opt. Lett., vol. 37, No. 2, 133-135, 2012.
Yu et al., "Acoustic Measurements Using a Fiber Optic Sensor System," J. Intelligent Mat'l. Systems and Structures, vol. 14, pp. 409-414, Jul. 2003.
Yu et al., "Fiber Fabry-Perot sensors for detection of partial discharges in power transformers", Applied Optics Optical Society of America, vol. 42, No. 16, Jun. 1, 2003, pp. 3241-3250.
Yu, M., "Fiber-Optic Sensor Systems for Acoustic Measurements," Ph.D. Dissertation, University of Maryland, College Park, MD. 2002.
Zhu et al., "Miniature Fiber-Optic Pressure Sensor," IEEE Photonics Technology Letters, vol. 17, No. 2, 447-449, Feb. 2005.
International Search Report and Written Opinion dated Aug. 8, 2019 for PCT/US2019/023026.

\* cited by examiner

FIG. 2A:
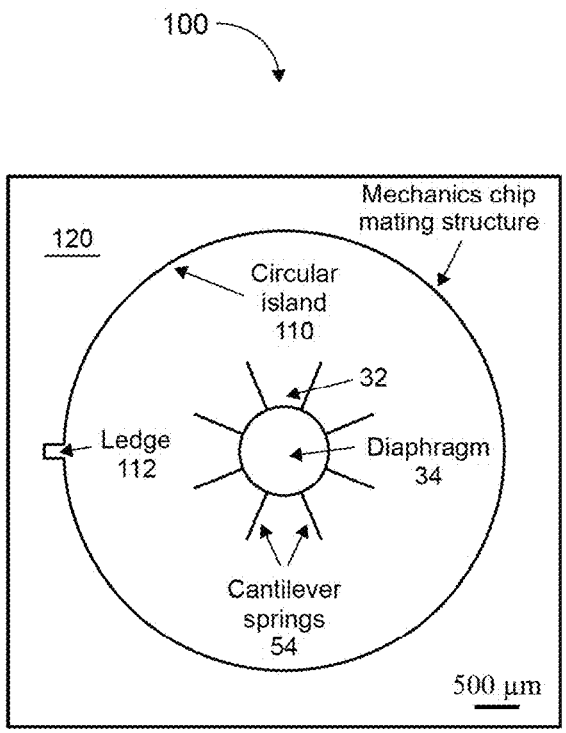
FIG. 2B:
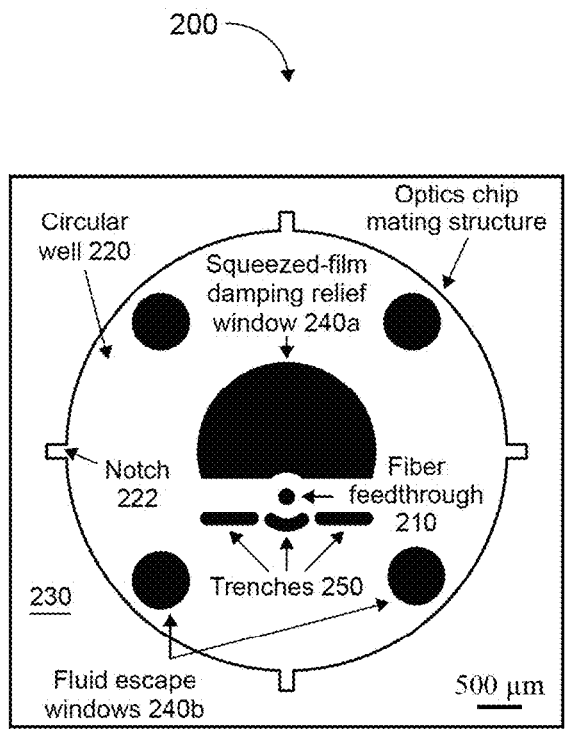
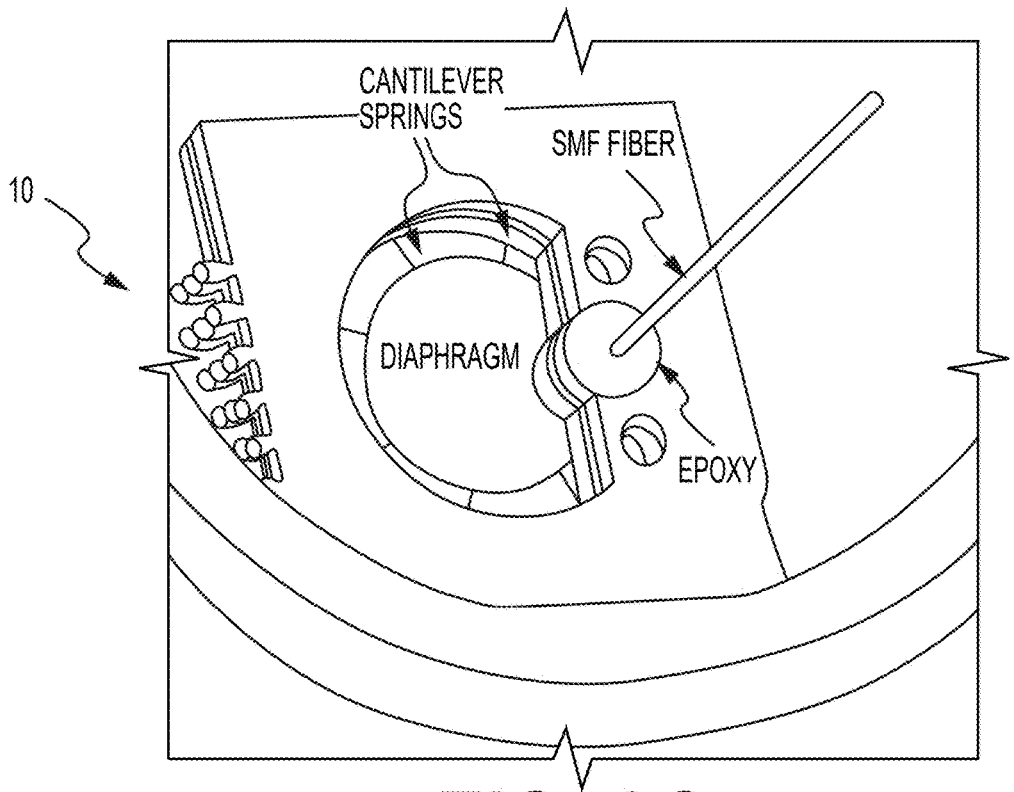
FIG. 2C

FIG. 2D:

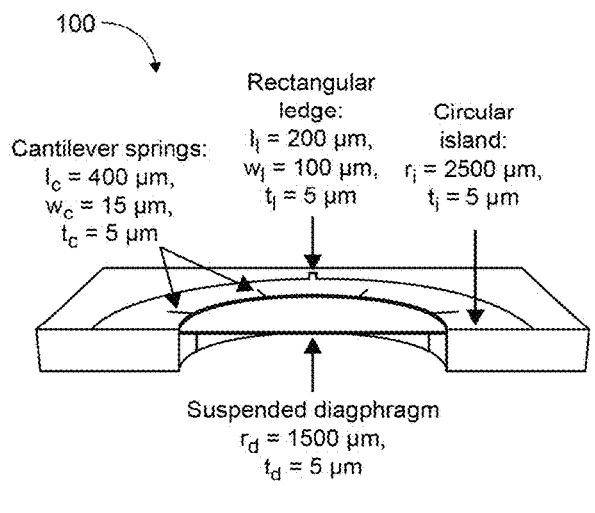

100

Cantilever springs:
$l_c$ = 400 μm,
$w_c$ = 15 μm,
$t_c$ = 5 μm

Rectangular ledge:
$l_l$ = 200 μm,
$w_l$ = 100 μm,
$t_l$ = 5 μm

Circular island:
$r_i$ = 2500 μm,
$t_i$ = 5 μm

Suspended diagphragm
$r_d$ = 1500 μm,
$t_d$ = 5 μm

FIG. 2E:

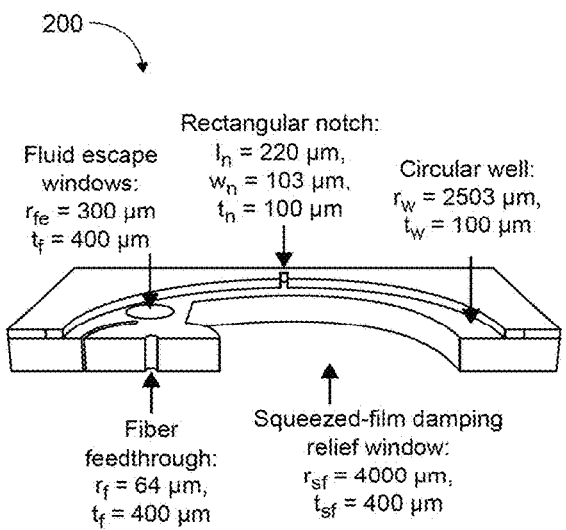

200

Fluid escape windows:
$r_{fe}$ = 300 μm,
$t_f$ = 400 μm

Rectangular notch:
$l_n$ = 220 μm,
$w_n$ = 103 μm,
$t_n$ = 100 μm

Circular well:
$r_w$ = 2503 μm,
$t_w$ = 100 μm

Fiber feedthrough:
$r_f$ = 64 μm,
$t_f$ = 400 μm

Squeezed-film damping relief window:
$r_{sf}$ = 4000 μm,
$t_{sf}$ = 400 μm

FIG. 2F:

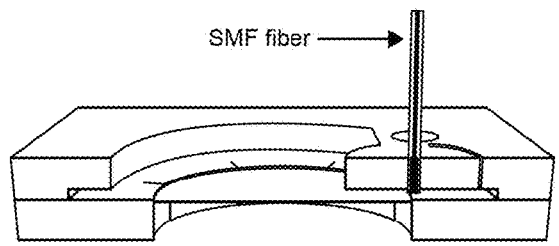

SMF fiber

SELF-ALIGNING OPTICAL ACOUSTIC SENSORS

CLAIM OF PRIORITY

This application claims the benefit of priority to U.S. Provisional Appl. No. 63/362,496 filed Apr. 5, 2022 and incorporated in its entirety by reference herein.

STATEMENT REGARDING FEDERALLY SPONSORED R&D

This invention was made with Government support under Contract No. W911NF-16-C-0023 awarded by the Defense Advanced Research Projects Agency. The Government has certain rights in the invention.

BACKGROUND

Field

This application relates generally to fiber-optic-based sensors and methods of fabrication, including but not limited to acoustic sensors, inertial sensors, and/or force sensors.

Description of the Related Art

Micro-electromechanical systems (MEMS) and sensors technologies are used in a wide range of applications from optical displays and switches (see, e.g., P. F. Van Kessel et al., "A MEMS-based projection display," *Proc. IEEE*, vol. 86, no. 8, 1687-1704 (1998); C. R. Giles et al., "A silicon MEMS optical switch attenuator and its use in lightwave subsystems," *IEEE J. Sel. Topics in Quant. Electr.*, vol. 5, no. 1,18-25 (1999)), to pressure (see, e.g., O. N. Tufte et al., "Silicon diffused-element piezoresistive diaphragms," *J. Appl. Phys.*, vol. 33, no. 1, 3322-3327 (1962)), inertial guidance (see, e.g., L. M. Roylance and J. B. Angell, "A batch-fabricated silicon accelerometer," *IEEE Trans. Electron Devices*, vol. 26, no. 12, 1911-1917 (1979)) and biomedical sensors (see, e.g., E. Kalvesten, et al., "The first surface micromachined pressure sensor for cardiovascular pressure measurements," *Proc. MEMS 98. IEEE, Eleventh Ann. Int'l Workshop on Micro Electro Mech. Sys., An Investigation of Micro Structures, Sensors, Actuators, Machines and Systems*, Cat. No. 98CH36176, 574-579 (1998)).

Electronic MEMS sensor technologies mostly based on capacitive (see, e.g., J. Bernstein et al., "Low-noise MEMS vibration sensor for geophysical applications," *J. Microelectromech. Syst.*, vol. 8, no. 4, 433-438 (1999) and resistive (see, e.g., Tufte 1962)) readout techniques have benefitted from easy scaling for mass production and well-established micro-fabrication techniques to achieve substantial reductions in size, weight, power consumption and fabrication costs, leading to their ubiquitous deployment in billions of everyday devices. However, the same scaling laws set a limit on the sensitivity and sensing resolution of electronic MEMS devices, hindering their use in applications that require high resolution, examples of which include but are not limited to: tactical and strategic-grade navigation, underwater acoustics (see, e.g., D. Hill and P. Nash, "Fiber-optic hydrophone array for acoustic surveillance in the littoral," *Photonics for Port and Harbor Security*, vol. 5780, 1-11 (2005)), and microbiological applications (see, e.g., O. Loh et al., "The potential of MEMS for advancing experiments and modeling in cell mechanics," *Exp. Mech.*, vol. 49, no. 1, 105-124 (2009)).

More recently, optical readout techniques have been integrated with microfabricated mechanical structures, such as diaphragms and mass-spring micro-system, to bridge this resolution gap (see, e.g., B. H. Afshar and M. J. F. Digonnet, "Spring-loaded diaphragm-based fiber acoustic sensor," *J. of Lightwave Technol.*, vol. 45, no. 14, 3933-3936 (2020); W. Jo et al., "Highly sensitive phase-front-modulation fiber acoustic sensor," *J. of Lightwave Technol.*, vol. 33, no. 20, 4377-4383 (2015); W. Jo et al., "Miniature fiber acoustic sensors using a photonic-crystal membrane," *Opt. Fiber Technol.*, vol. 19, no. 6, 785-792 (2013); O. Kilic et al., "Miniature photonic-crystal hydrophone optimized for ocean acoustics," *J. of Acoust. Soc. of Am.*, vol. 129, no. 4, 1837-1850 (2011)).

Optical interferometric readout techniques can be generally classified in two categories, two-wave and multi-wave interferometers. One common implementation of a multi-wave interferometer is a Fabry-Perot (FP) etalon formed between the end-face of a highly reflective single-mode fiber and that of a compliant diaphragm (see, e.g., Kilic 2011; Jo 2013; U.S. Pat. No. 10,495,508). The vibrations of the diaphragm, induced by an incident acoustic pressure, modulate the length of the FP cavity and its resonance frequencies. Laser light launched through the fiber is then used to probe this spectral modulation. For example, if the laser frequency is tuned to a steep portion of a resonance, the cavity length modulation will modulate the intensity of the reflected optical signal. The amplitude and frequency of the acoustic pressure can be inferred by detecting the reflected intensity fluctuations. High-finesse FP-based optical acoustic sensors have been widely reported in the literature (see, e.g., Kilic 2011; Jo 2013; U.S. Pat. No. 10,495,508), and can achieve resolutions as low as 2.6 µPa/√Hz between 1 kHz to 30 kHz (see, e.g., Jo 2013; U.S. Pat. No. 10,495,508). However, to maintain the high sensitivity of the FP to small diaphragm displacements, the probe-light frequency can be locked to the resonance frequency as the latter slowly drifts due to temperature changes (e.g., using a Pound Drexel Hall technique) to make operation of a single FP sensor more complex, and the operation of multiple FP sensors in large arrays more challenging.

SUMMARY

In certain implementations, an acoustic sensor comprises at least one optical waveguide configured to emit an optical beam. The acoustic sensor further comprises a substantially planar first substrate optically coupled to the at least one optical waveguide. The first substrate is configured to be illuminated by the optical beam and to reflect at least a portion of the optical beam to the at least one optical waveguide. The first substrate comprises a first substrate portion configured to reflect a first portion of the optical beam back to the at least one optical waveguide. The first substrate further comprises a diaphragm configured to reflect a second portion of the optical beam back to the at least one optical waveguide. The diaphragm is responsive to a perturbation by moving relative to the first substrate portion. The optical beam is centered on a region between the first substrate portion and the diaphragm. The acoustic sensor further comprises a substantially planar second substrate affixed to the first substrate and affixed to the at least one optical waveguide. The second substrate is substantially parallel to the first substrate.

In certain implementations, a method of fabricating an acoustic sensor comprises fabricating a substantially planar first substrate comprising a first substrate portion and a diaphragm. The diaphragm is configured to move relative to the first substrate portion in response to an acoustic perturbation. The method further comprises fabricating a substantially planar second substrate. The second substrate comprises a feedthrough hole and a plurality of orifices configured to allow a fluid medium to flow out from a region between the first substrate and the second substrate during operation of the acoustic sensor. The method further comprises aligning the first substrate and the second substrate to one another such that the feedthrough hole is aligned over a region between the first substrate portion and the diaphragm. The method further comprises affixing the first substrate and the second substrate to one another such that the second substrate is substantially parallel to the first substrate.

BRIEF DESCRIPTION OF THE FIGURES

FIGS. 2A and 2B schematically illustrate top views of an example first substrate and an example second substrate, respectively, in accordance with certain implementations described herein.

FIG. 2C is a photograph of an example acoustic sensor comprising an example first substrate and an example second substrate bonded together in accordance with certain implementations described herein.

FIGS. 2D and 2E schematically illustrate perspective cross-sectional views of the example first substrate and an example second substrate, respectively, of FIG. 2C in accordance with certain implementations described herein.

FIGS. 2D and 2E also include some example dimensions of various features of the first substrate and the second substrate in accordance with certain implementations described herein.

FIG. 2F schematically illustrates a perspective cross-sectional view of the example acoustic sensor of FIG. 2C with the first substrate and the second substrate bonded together in accordance with certain implementations described herein.

DETAILED DESCRIPTION

Figure 1A:
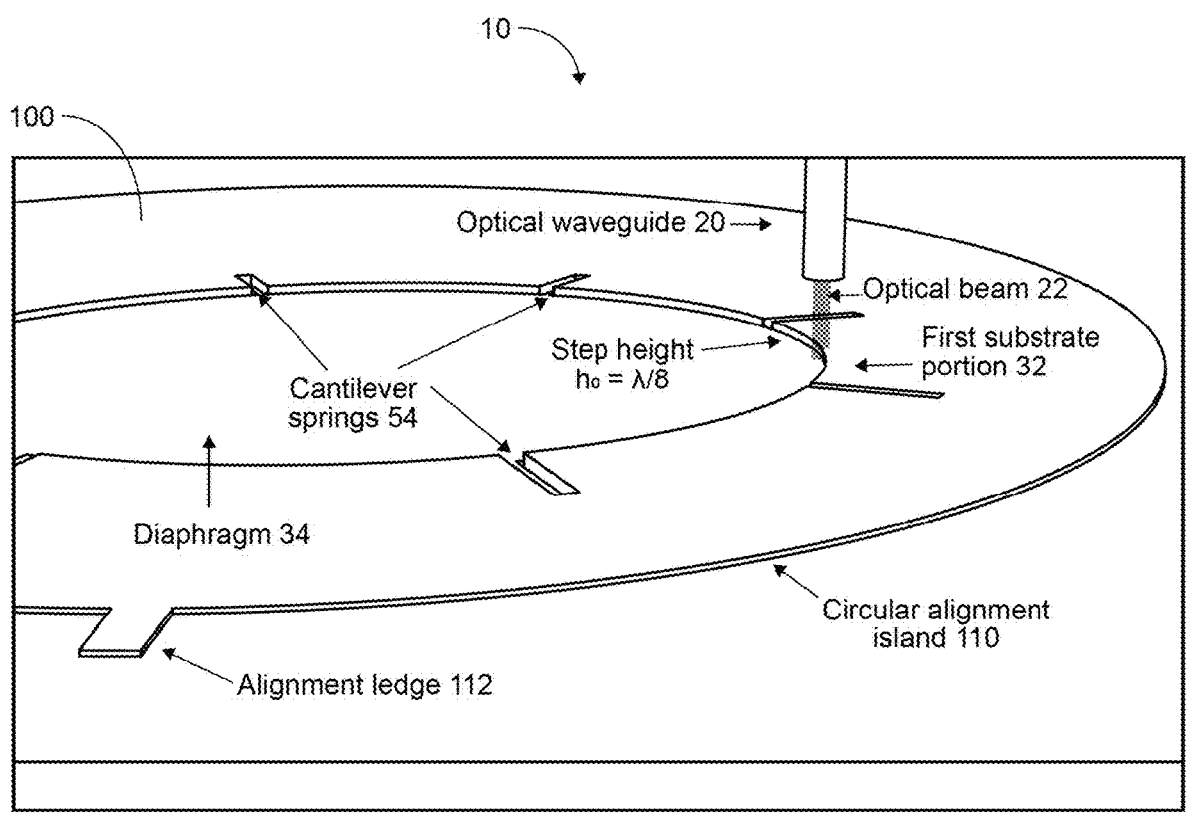
FIG. 1A schematically illustrates a perspective view of a portion of an acoustic sensor in accordance with certain implementations described herein.

Certain implementations described herein build upon a new class of MEMS-based two-wave interferometers, referred to as phase-front modulation (PFM) sensors, which are based on the modulation of the phase of an optical beam (see, e.g., U.S. Pat. No. 11,215,481; Afshar 2020) in which a single-mode fiber is a short distance (about 10-30 micrometers) from a silicon chip containing a compliant spring-loaded diaphragm suspended from a stationary substrate by cantilever springs. In the presence of an acoustic wave, the diaphragm vibrates in and out of the plane of the substrate. The fiber is aligned such that the optical beam is incident on the edge of the diaphragm, with half of the power incident on the diaphragm and the other half on the non-compliant adjacent substrate. Each portion of the optical beam power can be viewed as an arm of a two-wave Michelson interferometer. When exposed to an acoustic wave, the diaphragm vibrates relative to the adjacent substrate, which modulates the phase of the reflected beam. Consequently, the percentage of power in the reflected beam that is re-coupled into the fiber core is modulated, at the acoustic frequency. The amplitude and frequency of the acoustic wave can be inferred by measuring the optical power of the reflected beam.

The sensitivity of such a two-wave interferometer to small diaphragm displacements can be maximized by satisfying two conditions. First, the interferometer can be biased at quadrature (e.g., the diaphragm can be recessed relative to the adjacent substrate by $\lambda/8$, where $\lambda$ is the laser wavelength, resulting in a $\pi/2$ round-trip phase shift between the two arms). Second, the power in the two arms of the interferometer can be substantially equal to one another (e.g., the fiber can be positioned relative to the chip such that the optical power incident on the chip is distributed equally between the diaphragm and the adjacent portion of the substrate. However, satisfying the second condition using conventional techniques would entail a series of manual alignments and epoxy bonding procedures that require micrometer-scale precision to secure the fiber position relative the chip. Such procedures can be time intensive and difficult to mass-produce. Also, because it involves epoxy, over time the fiber position can drift, which can lead to undesirable variations in the acoustic sensitivity.

In certain implementations described herein, an acoustic sensor provides self-alignment of the fiber and the two-wave interferometer using a precise, repeatable and scalable structure. In addition, the fiber alignment is integrated into the micro-fabrication process. In certain implementations, an optical chip houses the optical fiber and a mechanical chip comprises the diaphragm, the optical and mechanical chips fabricated with a set of complementary mating structures (e.g., protrusions; recesses) that, when mated, position the two chips relative to one another such that the fiber is positioned precisely at the boundary between the diaphragm and the substrate. The acoustic sensor can also incorporate a large diaphragm as well as openings in the chips configured to let air/water flow through to reduce (e.g., minimize) squeezed-film damping of the diaphragm, thereby reducing the thermo-mechanical noise of the sensor structure (e.g., self-noise of the sensor limited by the extremely small thermos-mechanical noise induced by air/water molecules striking the diaphragm). Certain implementations described herein comprise a sensor having an air resolution in the sub-$\mu$Pa/$\sqrt{Hz}$ regime.

Example Acoustic Sensors

FIG. 1A schematically illustrates a perspective view of a portion of an acoustic sensor 10 in accordance with certain implementations described herein. The acoustic sensor 10 comprises at least one optical waveguide 20 configured to emit an optical beam 22. The sensor 10 further comprises a first substrate 100 optically coupled to the at least one optical waveguide 20 and a second substrate 200 (not shown in FIG. 1A) affixed to the first substrate 100 and affixed to the at least one optical waveguide 20. The first substrate 100 is configured to be illuminated by the optical beam 22 and to reflect at least a portion of the optical beam 22 to the at least one optical waveguide 20. The first substrate 100 comprises a first substrate portion 32 configured to reflect a first portion of the optical beam 22 back to the at least one optical waveguide 20. The first substrate 100 further comprises a diaphragm 34 configured to reflect a second portion of the optical beam 22 back to the at least one optical waveguide 20. The diaphragm 34 is responsive to a perturbation by moving relative to the first substrate portion 32. The optical beam 22 is centered on a region between the first substrate portion 32 and the diaphragm 34.

In certain implementations, the at least one optical waveguide 20 has a mode-field diameter greater than 11 $\mu$m (e.g., greater than 12 $\mu$m; greater than 15 $\mu$m; greater than 17 $\mu$m; in a range between 12 $\mu$m and 45 $\mu$m; in a range between 15 $\mu$m and 40 $\mu$m; in a range between 20 $\mu$m and 40 $\mu$m; in a range between 17 $\mu$m and 35 $\mu$m). The at least one optical waveguide 20 can comprise an optical fiber having an end configured to emit the optical beam 22 that propagates towards the diaphragm 34. The light beam can have a divergence angle less than 2.3 degrees (for an LMA fiber) or in a range of 2.3 degrees to 5.4 degrees (for an SMF fiber). The optical fiber can be further configured to receive reflected light from the first substrate portion 32 and the diaphragm 34, the reflected light comprising a first reflected portion from the first substrate portion 32 and a second reflected portion from the diaphragm 34. In certain implementations, the optical fiber comprises a large mode area (LMA) optical fiber, a tapered optical fiber (e.g., a tapered portion of a single-mode fiber, such as an SMF-28 fiber), and/or a photonic-crystal fiber. Example LMA fibers compatible with certain embodiments described herein can be obtained from Nufern Inc. of East Granby CT, nLIGHT Inc. of Vancouver WA, and NKT Photonics of Denmark. Example photonic-crystal fibers compatible with certain embodiments described herein are available from NKT Photonics of Denmark and Thorlabs of Newton NJ. Example tapered optical fibers compatible with certain embodiments described herein can be made using SMF fiber from Corning Inc. of Corning NY. For example, the LMA fiber can have a numerical aperture of 0.06, a core radius of 10 micrometers, and a cladding radius of 200 micrometers. For another example, the photonic-crystal fiber can have a numerical aperture of 0.06, a core radius of 12.5 micrometers, and a cladding radius of 129 micrometers. For another example, the tapered fiber can have a numerical aperture of 0.14, a core radius of 1.1 micrometers, and a cladding radius of 17.5 micrometers.

In certain implementations, the first substrate 100 is substantially planar (e.g., wafer; chip) and is placed a short, non-critical distance (e.g., 10 micrometers-100 micrometers) from the end of the optical fiber of the at least one optical waveguide 20. In certain implementations, the first substrate 100 comprises at least one of the following materials: silicon, silicon nitride, silicon carbide, graphite, graphene. At least one of the first substrate portion 32 and the diaphragm 34 can be optically reflective. For example, each of the first substrate portion 32 and the diaphragm 34 can comprise an optically-reflective material (e.g., a metal layer; a gold layer) or an optically-reflective structure (e.g., a photonic-crystal structure or a dielectric stack).

In certain implementations, a perimeter of the diaphragm 34 is substantially surrounded by the first substrate portion 32. For example, as shown in FIG. 1A, the diaphragm 34 can be within a well microfabricated into the first substrate 100 (e.g., at a depth $h_0$ below the surface of the first substrate portion 32). In certain implementations, the distance between the top surfaces of the first substrate portion 32 and the diaphragm 34 (e.g., the depth $h_0$ is approximately equal to $\lambda/8$ (e.g., equal to $\lambda/8$ to within $\pm 10\%$, $\pm 5\%$, or $\pm 2\%$), where $\lambda$ is the wavelength of the optical beam 22 (e.g., $\lambda=1.55$ micrometers or other near-infrared wavelength).

In certain implementations, the diaphragm 34 is substantially planar and has a shape in a plane parallel to the diaphragm 34 that is circular, square, rectilinear, triangular, or another shape. The diaphragm 34 can be significantly thinner (e.g., by hundreds of nanometers) than portions of the first substrate 100 substantially surrounding the perimeter of the diaphragm 34. In certain implementations, the first substrate 100 further comprises a plurality of cantilever springs 54 (e.g., 2, 3, 5, 6, 7, 8, 9, 10, or more) that is mechanically coupled to the diaphragm 34 such that the diaphragm 34 is elastically movable relative to the first substrate portion 32 in a direction substantially perpendicular to the diaphragm 34 in response to the perturbation. For example, as shown in FIG. 1A, the diaphragm 34 can be substantially circular with substantially identical cantilever springs 54 extending radially outward from the diaphragm 34, the cantilever springs 54 suspending the diaphragm 34 from the substrate 100. In certain implementations, the diaphragm 34 and the cantilever springs 54 are defined (e.g., separated from the first substrate portion 52) by gaps cut into the first substrate 100 (e.g., using microfabrication techniques). The first substrate 100 is configured to have the diaphragm 34 vibrate by translating in a direction that is generally perpendicular to the diaphragm 34 while the diaphragm 34 generally retains its shape (e.g., planar), and while the cantilever springs 54 elastically stretch and move. The optical beam 22 emitted from the at least one optical waveguide 20 straddles the first substrate portion 32 and the diaphragm 34 such that the optical power incident on the first substrate portion 32 is substantially equal to the optical power incident on the diaphragm 34. Portions of the optical beam 22 are reflected from the first substrate portion 32 and the diaphragm 34 back to the at least one optical waveguide 20.

Figure 1B:
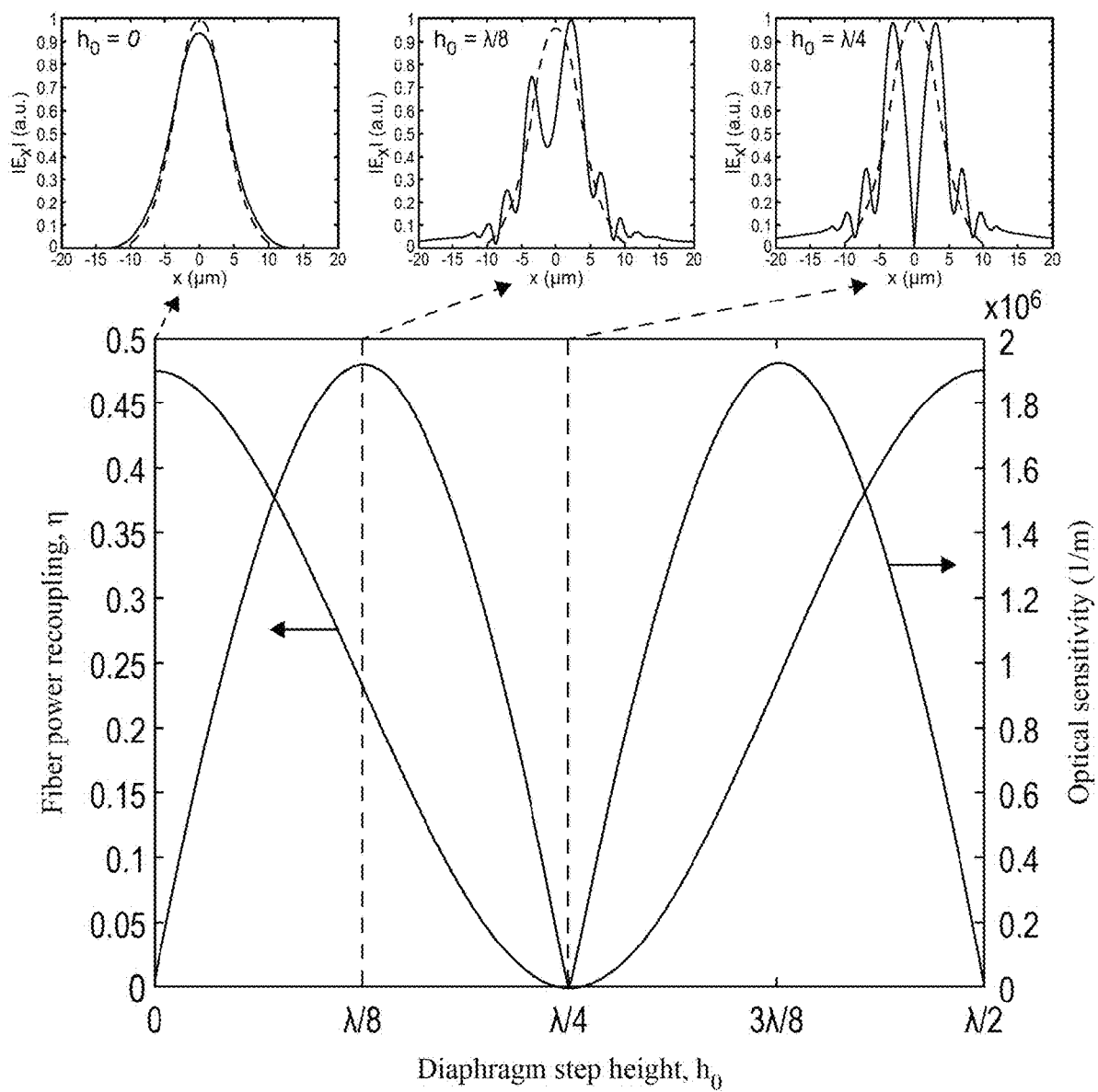
FIG. 1B shows plots of the optical power recoupling of a reflected portion of the optical beam from the first substrate and an optical sensitivity of the acoustic sensor as functions of the step height $h_0$ in accordance with certain implementations described herein.

The percentage of reflected power recoupled into the at least one optical waveguide 20 depends on the relative position of the diaphragm 34 to the first substrate portion 32. FIG. 1B shows plots of the optical power recoupling of a reflected portion of the optical beam 22 from the first substrate 100 and an optical sensitivity of the acoustic sensor 10 as functions of the step height $h_0$ in accordance with certain implementations described herein. FIG. 1B also shows the field profile of the incident optical beam 22 (dashed lines) overlayed with plots of the reflected field profiles (solid lines) for three different step heights $h_0=0$, $h_0=\lambda/8$, and $h_0=\lambda/4$, where $\lambda$ is the wavelength of the incident optical beam 22. The optical beam 22 emerging from the end of the optical waveguide 20 is incident on the edge of the diaphragm 34, with equal portions of its intensity distributed between the diaphragm 34 and the non-compliant, adjacent first substrate portion 32. When the diaphragm 34 is at the same plane as the adjacent first substrate portion (e.g., $h_0=0$), akin to a flat mirror, both portions of the optical beam 22 have the same round-trip phase shift. The reflected portions of the optical beam 22, propagating back towards the optical waveguide 20, maintain a fundamental transverse electromagnetic $TEM_{00}$ profile (see, solid curve in the top, left plot of FIG. 1B) and is effectively recoupled back into the optical waveguide 20. However, when the diaphragm 34 is displaced by a distance $h_0=\lambda/4$ from the first substrate portion 32, where $\lambda$ is the laser wavelength, the portion of the optical beam 22 reflected from the diaphragm 34 accumulates an additional $\pi$ round-trip phase shift relative to the portion of the optical beam 22 reflected from the adjacent first substrate portion 32. The reflected field profile at the end of the optical waveguide 20 (e.g., calculated by diffraction theory) is no longer a fundamental $TEM_{00}$ mode but has a two-lobed symmetrical amplitude profile (see, solid curve in the top, right plot of FIG. 1B) and an asymmetrical phase profile, similar to a $TEM_{01}$ mode, and is poorly recoupled into the optical waveguide 20. In this configuration, the acoustic sensor 10 is a two-wave interferometer, similar to a Michelson interferometer, where the two portions of the intensity illuminating the diaphragm 34 and the adjacent first substrate portion 32 comprise each arm of the interferometer. To bias the interferometer at the maximum sensitivity to small displacements of the diaphragm 34, the diaphragm 34 is recessed below the top surface of the adjacent first substrate portion by $\lambda/8$ (e.g., $h_0=\lambda/8+m\lambda/4$, where m is an integer) such that the interferometer is biased in quadrature (e.g., $\pi/2$ round-trip phase shift), with equal compositions of $TEM_{00}$ and $TEM_{01}$ and at maximum sensitivity. The recoupled power dependence on step height (e.g., fiber power recoupling $\eta$) is maximized at step heights $h_0=0$ and $\lambda/2$ and minimum at $h_0=\lambda/4$ and the slope of the recoupled power dependence on step height is maximized at step heights $h_0=\lambda/8$ and minimum at $h_0=3\lambda/8$.

FIGS. 2A and 2B schematically illustrate top views of an example first substrate 100 and an example second substrate 200, respectively, in accordance with certain implementations described herein. The first substrate 100 is substantially planar (e.g., wafer; chip), the second substrate 200 is substantially planar (e.g., wafer; chip), and the second substrate 200 is configured to be bonded to the first substrate 100 such that the second substrate 200 is substantially parallel to the first substrate 100. FIG. 2C is a photograph of an example acoustic sensor 10 comprising an example first substrate 100 and an example second substrate 200 bonded together in accordance with certain implementations described herein. FIGS. 2D and 2E schematically illustrate perspective cross-sectional views of the example first substrate 100 and an example second substrate 200, respectively, of FIG. 2C in accordance with certain implementations described herein. FIGS. 2D and 2E also include some example dimensions of various features of the first substrate 100 and the second substrate 200 in accordance with certain implementations described herein. FIG. 2F schematically illustrates a perspective cross-sectional view of the example acoustic sensor 10 of FIG. 2C with the first substrate 100 and the second substrate 200 bonded together in accordance with certain implementations described herein.

As shown in FIGS. 1A, 2A and 2D, the first substrate 100 comprises a compliant, substantially circular diaphragm 34 (e.g., at a center of the first substrate 100) suspended by a plurality (e.g., 8) of cantilever springs 54 that are substantially identical to one another and extending radially from the diaphragm 34. When an acoustic wave is incident on the diaphragm 34, the diaphragm 34 vibrates, in a piston-like motion in a direction substantially perpendicular to the diaphragm 34, relative to the non-compliant (e.g., non-moving) adjacent first substrate portion 32. As shown in FIGS. 2B and 2E, the second substrate 200 comprises an optical fiber feedthrough hole 210 extending through the second substrate 200 and configured to receive the optical waveguide 20 (e.g., single-mode fiber). The optical waveguide 20 can be fixed within the optical feedthrough hole 210 by adhesive (e.g., epoxy) such that after the first substrate 100 and the second substrate 200 are affixed together, an end of the optical waveguide 20 is spaced (e.g., by about 10 micrometers) from the first substrate 100 and positioned such that light emitted from the end of the optical waveguide 20 propagates substantially perpendicularly to the first substrate 100 and light reflected from the diaphragm 34 and the adjacent first substrate portion 32 propagates substantially perpendicularly to the first substrate 100 back to the end of the optical waveguide 20.

In certain implementations, the first substrate 100 and the second substrate 200 comprise complementary mating structures configured to facilitate alignment of the optical waveguide 20 with the edge of the diaphragm 34. For example, as schematically illustrated by FIGS. 1A, 2A, and 2D, the first substrate 100 can comprise at least one alignment island (e.g., protrusion) 110, and as schematically illustrated by FIGS. 2B and 2E, the second substrate 200 can comprise at least one alignment well (e.g., recess) 220. The at least one alignment island 110 is configured to fit within the at least one alignment well 220 (e.g., analogous to LEGO® pieces) to fix (e.g., self-align) the relative positions of the diaphragm 34 of the first substrate 100 and the feedthrough hole 210 of the second substrate 200 (e.g., a center of the feedthrough hole 210 is aligned with an edge of the diaphragm 34). While FIGS. 1A, 2A, 2B, 2D, and 2E shown an alignment island 110 and an alignment well 220 that are substantially circular, other shapes (e.g., oval; square; polygonal; irregular) are also compatible with certain implementations described herein.

In certain implementations, the perimeter of the at least one alignment island 110 has a step edge such that the at least one alignment island 110 has a height above a surface of a region 120 of the first substrate 100 substantially surrounding the at least one alignment island 110 and the perimeter of the at least one alignment well 220 has a depth below a surface of a region 230 of the second substrate 200 substantially surrounding the at least one alignment well 220. In certain implementations, the width (e.g., diameter) of the at least one alignment island 110 has a first width that is less than a second width of the at least one alignment well 220. For example, the height can be less than the depth (e.g., by about 100 micrometers) and the first width can be less than the second width (e.g., by about 5 micrometers to 8 micrometers) such that the top surface of the at least one alignment island 110 does not contact the top surface of the at least one alignment well 220 when the first substrate 100 is mated with the second substrate 200 (e.g., the surface of the region 120 of the first substrate 100 affixed to the surface of the region 230 of the second substrate 200) and the at least one alignment island 110 is tightly fit into the at least one alignment well 220.

In certain implementations, the at least one alignment island 110 comprises at least one alignment ledge 112 extending from a perimeter of the at least one alignment island 110 and the at least one alignment well 220 comprises at least one alignment notch 222 extending from a perimeter of the at least one alignment well 220. While FIGS. 1A, 2A, and 2D show the alignment island 110 having a single substantially rectangular alignment ledge 112 extending substantially perpendicularly to the perimeter of the alignment island 110 and FIGS. 2B and 2E show the alignment well 220 having four substantially rectangular alignment notches 222 (each of which can receive the single alignment ledge 112) positioned equidistantly around the alignment well 220, certain other implementations comprise multiple alignment ledges 112 (e.g., positioned equidistantly around the alignment island 110) and/or other shapes, sizes, and arrangements of the at least one alignment ledge 112 and/or the at least one alignment notch 222. In certain other implementations, the first substrate 100 comprises at least one alignment well and the second substrate 200 comprises at least one alignment island configured to fit within the at least one alignment well.

When the first substrate 100 is mated with the second substrate 200, the at least one alignment ledge 112 can be tightly fit within the at least one alignment notch 222. The at least one alignment notch 222 can provide a sufficiently precise fit (e.g., allowing only 1.5 micrometers of misplacement) to provide a sufficiently precise alignment between the center of the feedthrough hole 210 and the edge of the diaphragm 34. In addition, the at least one alignment ledge 112 and the at least one alignment notch 222 can provide redundancy to account for small variations in fabricated dimensions. For example, as shown in FIGS. 2A and 2B, the at least one alignment ledge 112 can comprise a single ledge 112 extending from the alignment island 110 and the at least one alignment notch 222 can comprises four notches 222 arranged equidistantly along and extending from the perimeter of the alignment well 220, such that the first substrate 100 of FIGS. 2A and 2D can be rotated by 90-degree increments to be fitted to the second substrate 200 of FIGS. 2B and 2E, respectively, until a minimum misalignment between the center of the feedthrough hole 210 and the edge of the diaphragm 34 amongst the four possible orientations is achieved. Owing to small variations in fabricated dimensions, not all four orientations provide the same alignment precision. After identifying the orientation having the smallest misalignment, the first and second substrates 100, 200 can be placed in the orientations having the smallest misalignment and can be attached to one another in this orientation (e.g., using thermos-compression bonding of gold; see, e.g., C. Tsau et al., "Characterization of wafer-level thermocompression bonds," *J. Microelectromech. Syst.*, vol. 13, no. 6, 963-971 (2004)).

In certain implementations, the second substrate 200 further comprises one or more orifices 240 (e.g., squeezed-film damping relief windows 240a, fluid escape windows 240b) configured to allow a fluid medium (e.g., air; water) to flow out from a region between the first substrate 100 and the second substrate 200 to reduce (e.g., minimize) squeezed-film damping of the diaphragm motion (see, e.g., M. Bao and H. Yang, "Squeeze film air damping in MEMS," *Sens. Actuator A Phys.*, vol. 136, no. 1, 3-27 (2007)). For example, as shown in FIGS. 2B and 2E, the squeezed-film damping relief window 240a can have a substantially semicircular shape positioned over a majority of the diaphragm 34 and the fluid escape windows 240b can comprise multiple (e.g., two; four) substantially symmetrically placed substantially circular windows that are configured to provide additional fluid escape routes. In certain implementations comprising the one or more orifices 240, the acoustic sensor 10 can be submerged underwater to be utilized as a hydrophone, without trapping small air pockets within the region between the first substrate 100 and the second substrate 200.

In certain implementations, the second substrate 200 further comprises one or more trenches 250. For example, the one or more trenches 250 of FIG. 2B include a set of horizontal and curved trenches 250 in proximity to the feedthrough hole 210 and on an opposite side of the feedthrough hole 210 from the squeezed-film damping relief window 240a. Etching of the one or more trenches 250 during the fabrication process can facilitate a symmetric and vertical etch profile for the feedthrough hole 210.

Fabrication Examples

Figure 3:
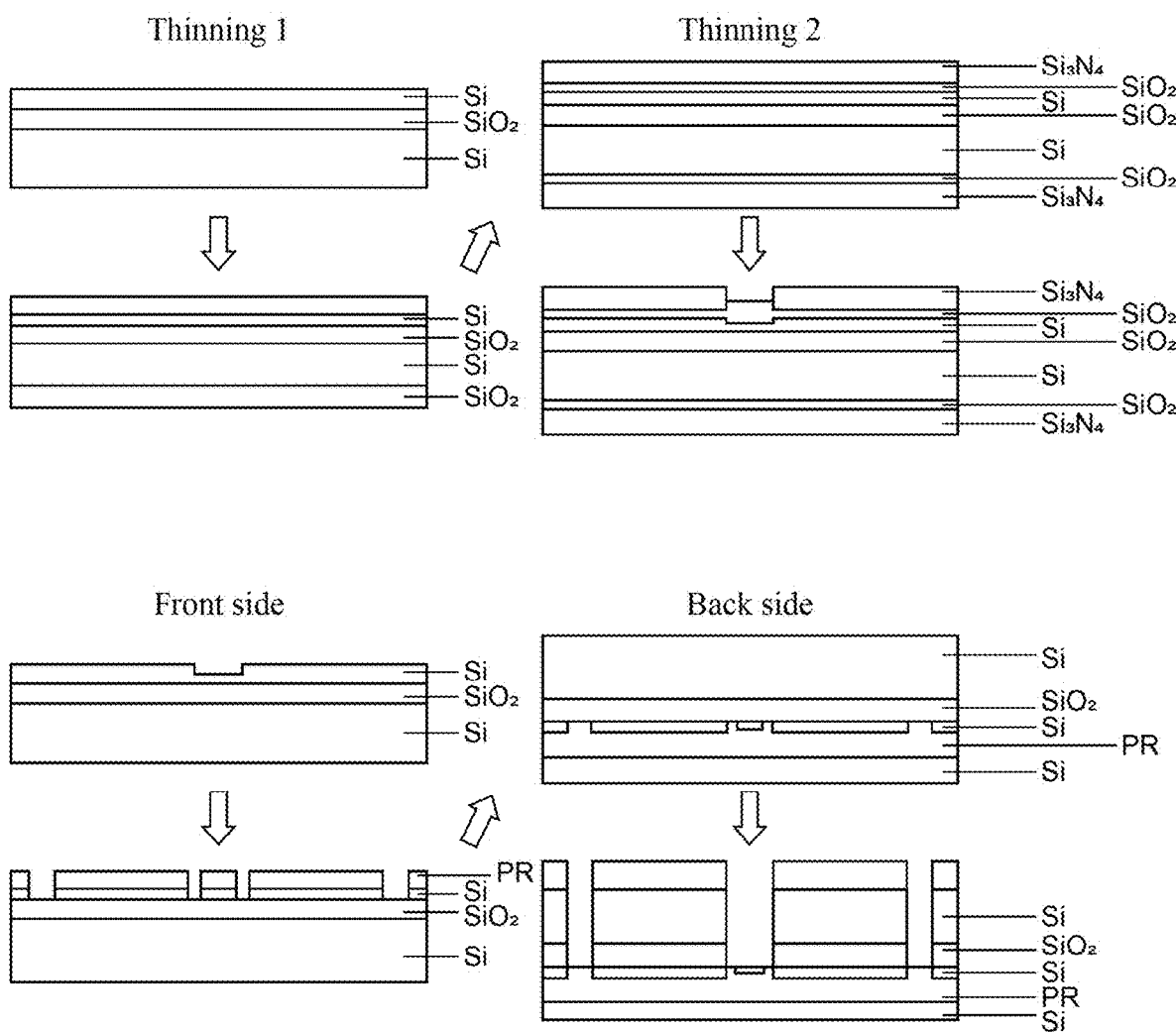
FIG. 3 schematically illustrates an example fabrication process of a first substrate in accordance with certain embodiments described herein.

FIG. 3 schematically illustrates an example fabrication process of a first substrate 100 in accordance with certain embodiments described herein. This example fabrication process was used at the Stanford Nanofabrication Facility to fabricate 88 first substrates 100 concurrently on a 4-inch silicon-on-insulator wafer with a 5-micrometer optically flat device layer, a 1-micrometer box layer, and a 500-micrometer substrate layer. In certain implementations, the fabrication process of the first substrate 100 involves two steps of device thinning by thermal oxidation following a dry etching process (e.g., to define the cantilever springs 54 and to release the diaphragm 34). For example, the diaphragm 34 can be fabricated on the device layer first by thinning it to a thickness of 6.5 micrometers using thermal oxidation. Local oxidation of silicon (LOCOS) can then be used to create the $\lambda/8$ distance between the first substrate portion 32 and the diaphragm 34. Using deep reactive ion etch (DRIE), the shape of the diaphragm 34 and the alignment island 110 can be etched on the device layer. The wafer can then be flipped, and the diaphragm 34, suspended on the $SiO_2$ box layer, can be exposed from the substrate layer using another DRIE step. The box layer can then be removed by vapor hydrofluoric acid to fully release the diaphragm 34. The device layer can be coated with a 7-nanometer-thick chromium adhesion layer, and a 40-nanometer-thick gold layer to increase its power reflectivity to a measured value of about 70%. The completed wafer can contain multiple first substrates 100 each with a single diaphragm 34 with dimensions summarized in Table 1:

| Parameter | Design value |
| --- | --- |
| Diaphragm radius (a) | 500, 1000, or 1500 micrometers |
| Cantilever length (L) | 400 or 600 micrometers |
| Number of cantilevers (n) | 8 |
| Young's modulus of Si (E) | 169 GPa |
| Cantilever width (w) | 15 micrometers |
| Cantilever height (h) | 5 micrometers |

Figure 4A:
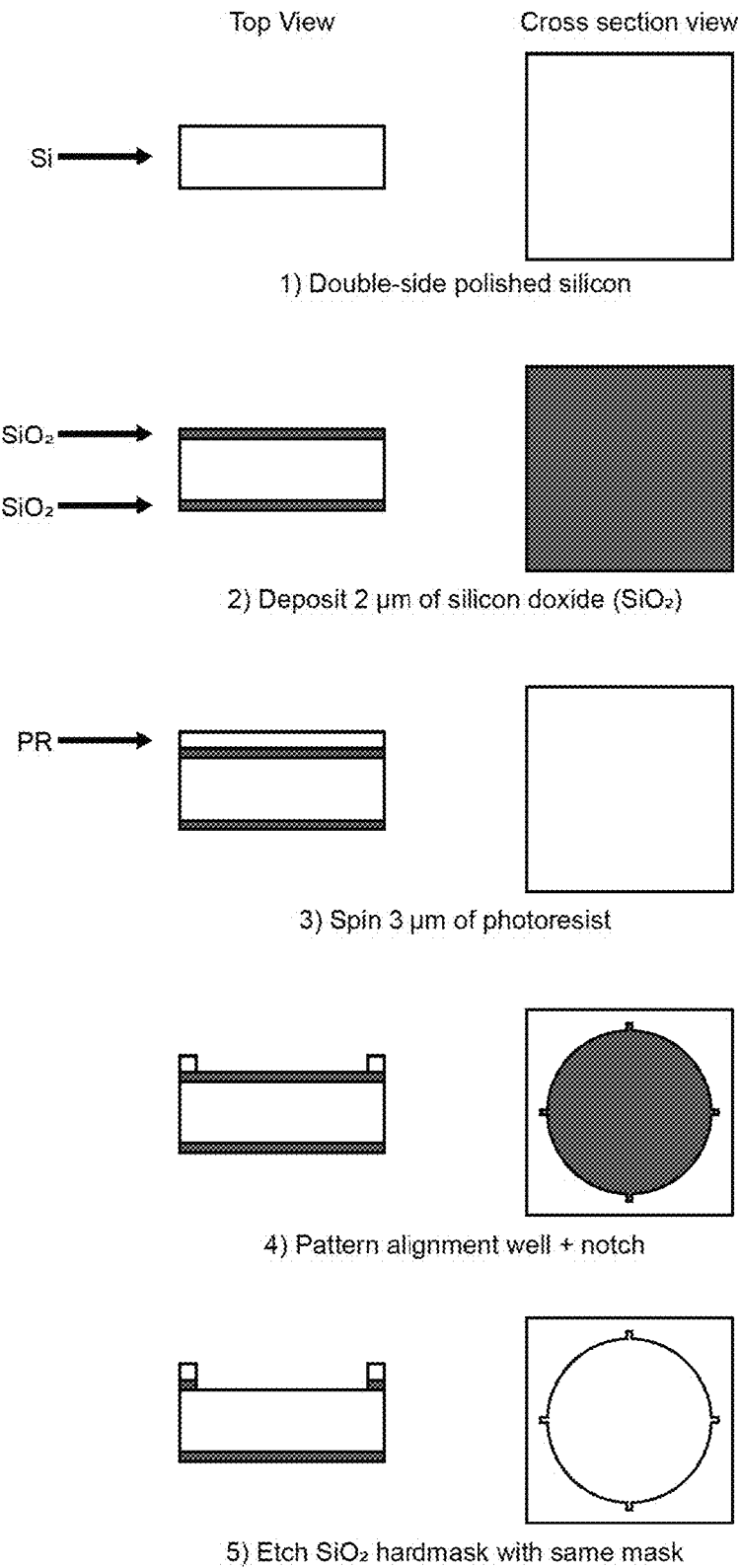
FIGS. 4A-4C schematically illustrate top views and cross section view of an example second substrate at various stages of an example fabrication process in accordance with certain embodiments described herein.
Figure 4B:
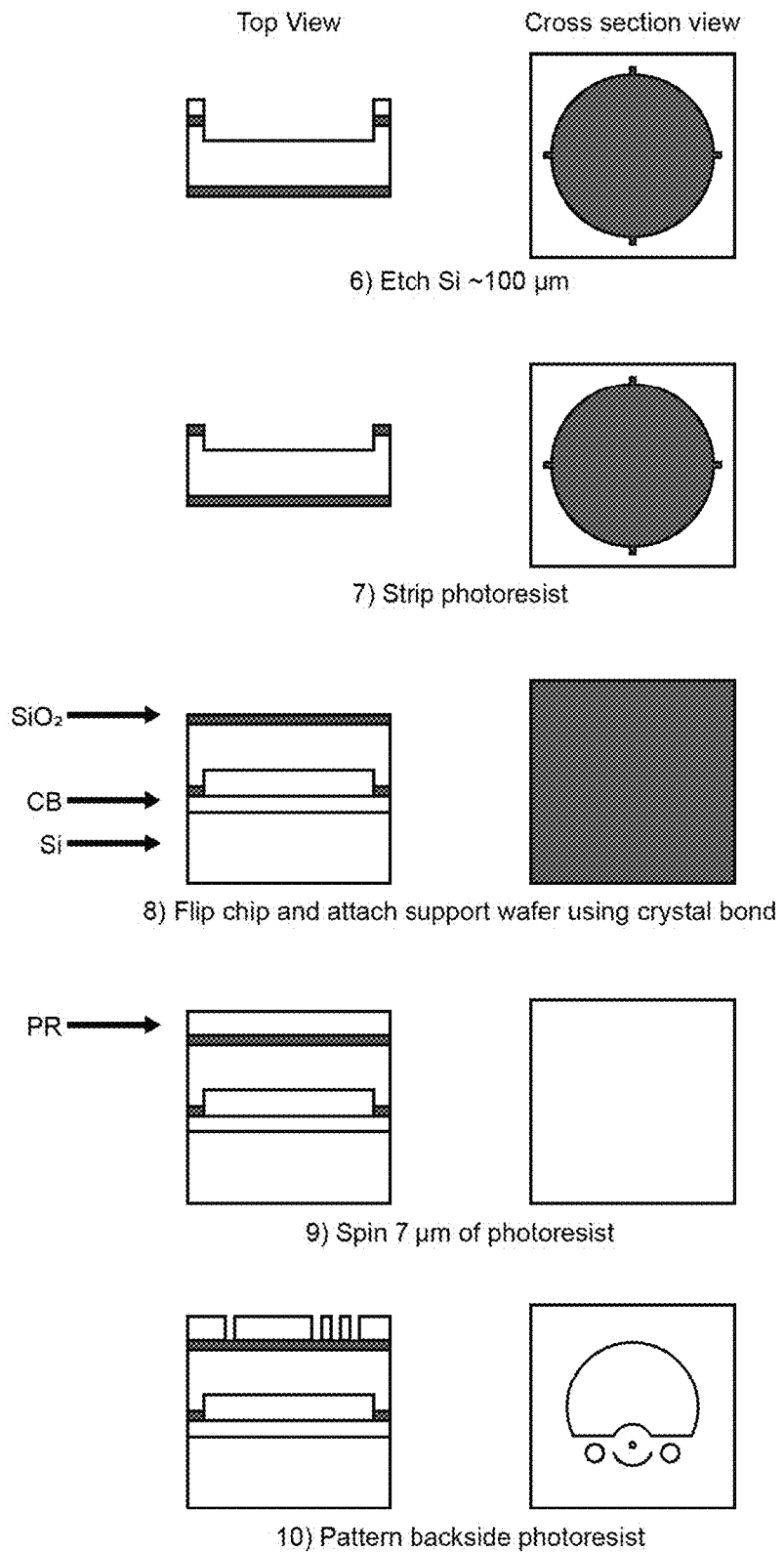
Figure 4C:
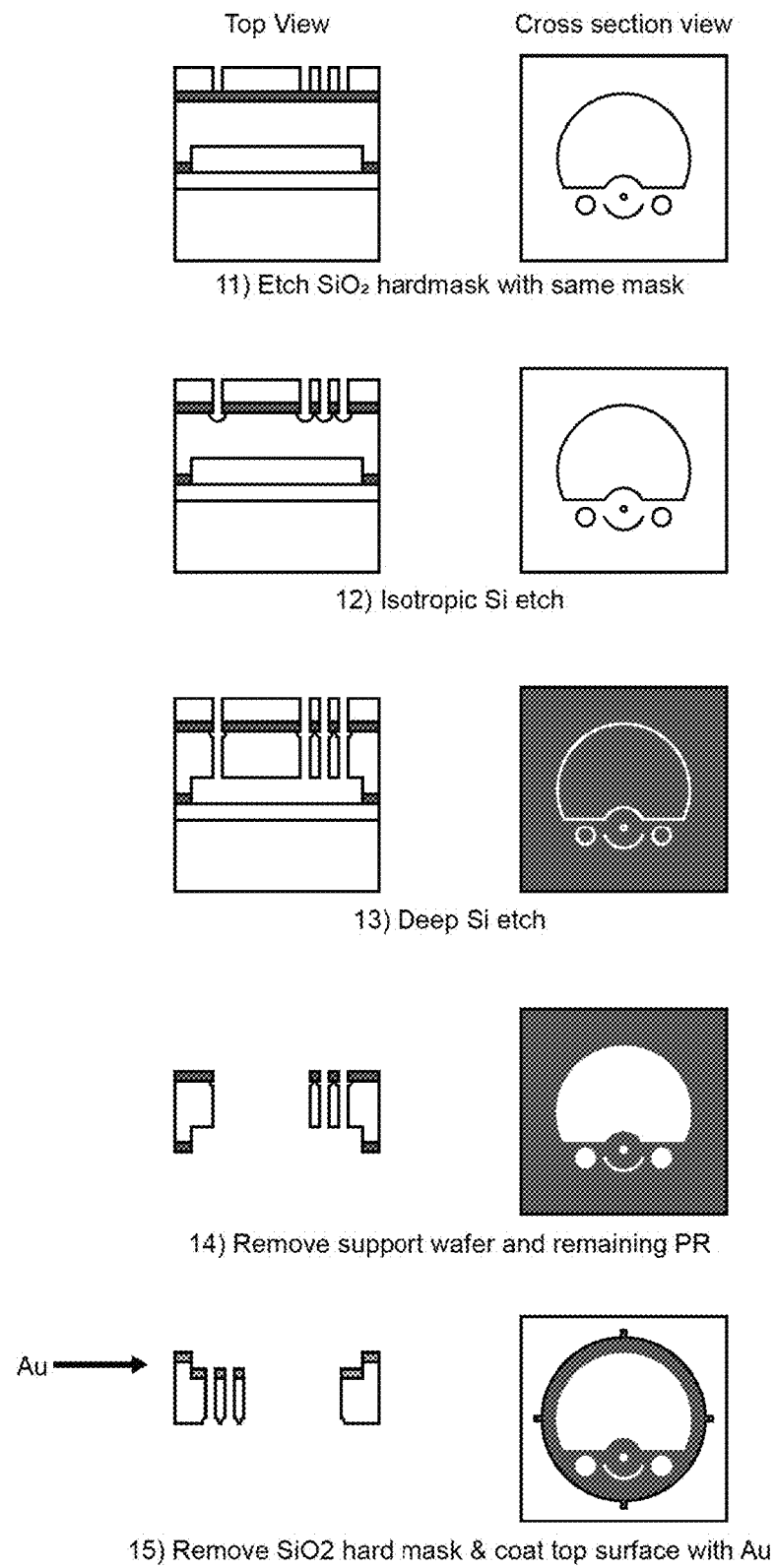

FIGS. 4A-4C schematically illustrate top views and cross section view of an example second substrate 200 at various stages of an example fabrication process in accordance with certain embodiments described herein. This example fabrication process was also used at the Stanford Nanofabrication Facility on a standard 500-micrometer thick, 4-inch silicon wafer to fabricate 88 second substrates 200 concurrently. Plasma enhanced chemical deposition can be used to deposit 2 micrometers of silicon dioxide hard-mask on both surfaces of the Si wafer and a 3-micrometer-thick layer of photoresist (PR) can be spun on the top $SiO_2$ surface of the Si wafer. Structures corresponding to an alignment well 220 with four substantially rectangular alignment notches 222 can be exposed on the PR and then etched through the $SiO_2$ hard-mask (e.g., with a magnetically-enhanced reactive ion etcher (MERIE)). The exposed regions of the Si wafer, in the shape of the alignment well 220 and the four alignment notches can be etched using DRIE to a depth of 100 micrometers.

To pattern the backside of the second substrate 200, the Si wafer can be flipped over and attached to a support wafer (e.g., using Crystalbond™ adhesive), and a 7-micrometer-thick layer of PR can be spun on its backside. The PR can be exposed with a pattern including the feedthrough holes 210, squeezed-film damping relief windows 240a, and fluid escape windows 240b.

In certain implementations, rather than exposing the PR to the full window pattern, the PR can be exposed to a pattern comprising lines (e.g., 60-micrometer wide tracks) tracing the perimeters of the windows 240a, 240b, along with the trenches 250 (e.g., at an opposite side of the feedthrough hole 210 from the squeezed-film damping relief window 240a). The trenches 250 are configured to substantially reduce asymmetry in the electric fields at the surface of the oxide hard-mask in the proximity of the feedthrough hole 210 that would otherwise occur during a subsequent DRIE step due to etching of the squeezed-film damping relief window 240a in close proximity to the smaller feedthrough hole 210 and fluid escape windows 240b. Without the trenches 250, such asymmetrical electric fields can adversely affect the geometry and/or orientation of the etched feedthrough hole 210 causing imprecision in the resulting position and/or orientation of the optical waveguide 20 within the feedthrough hole 210. By including the trenches 250, certain implementations facilitate a symmetrical charge build up on the oxide hard-mask surface in the proximity of the feedthrough hole 210 during the subsequent DRIE step.

After exposing the PR, the backside $SiO_2$ hard-mask can be etched (e.g., using MERIE) through the $SiO_2$ to expose the pattern to the Si wafer. The feedthrough hole 210 and the other structures of the pattern can then be etched (e.g., using DRIE) all the way through the Si wafer. The support wafer can be removed (e.g., by dissolving the Crystalbond™ adhesive in acetone) and the $SiO_2$ hard-mask can be etched away (e.g., in a 49% hydrofluoric acid solution). The top surface of the Si wafer can be coated with an adhesion layer of chromium (e.g., 7-nanometers thick) and then gold (e.g., 15-nanometers thick). The resulting second substrates 200 are configured to have precise features that complement the features of the first substrates 100.

In certain implementations, fabrication of the acoustic sensor 10 comprising a method of aligning and bonding the first substrate 100 and the second substrate 200 to one another to reduce (e.g., minimize) an offset (e.g., due to fabrication tolerances) between the feedthrough hole 210 and the edge of the diaphragm 24. For example, the first and second substrates 100, 200 can be mounted on a flip-chip bonder. The method can comprise placing the first and second substrates 100, 200 in a first orientation relative to one another in which the at least one alignment ledge 112 of the first substrate 100 is substantially aligned with the at least one alignment notch 222 of the second substrate 200 (e.g., with a single alignment ledge 112 substantially aligned with a corresponding one of the four alignment notches 222 equidistant from one another around the alignment well 220). The method can further comprise substantially aligning a center of the feedthrough hole 210 with an edge of the diaphragm 34 while the first and second substrates 100, 200 are in a first orientation. The method can further comprise measuring a first offset between the center of the feedthrough hole 210 and the edge of the diaphragm 34 (e.g., using a beam splitter and microscope of the flip-chip bonder) while the first and second substrates 100, 200 are in the first orientation. The method can further comprise rotating one of the first and second substrates 100, 200 (e.g., by 90 degrees in the case of the single alignment ledge 112 and the four alignment notches 222) relative to the other of the first and second substrates 100, 200 such that the first and second substrates 100, 200 are in a second orientation relative to one another in which the at least one alignment ledge 112 is substantially aligned with the at least one alignment notch 222. The method can further comprise substantially aligning the center of the feedthrough hole 210 with the edge of the diaphragm 34 while in the second orientation. The method can further comprise measuring a second offset between the center of the feedthrough hole 210 and the edge of the diaphragm 34 (e.g., using a beam splitter and microscope of the flip-chip bonder) while the first and second substrates 100, 200 are in the second orientation. The method can further comprise further rotations to additional orientations in which the at least one alignment ledge 112 is substantially aligned with the at least one alignment notch 222, further substantial alignments of the center of the feedthrough hole 210 with the edge of the diaphragm 34 while in the additional orientations, and further measuring additional offsets between the center of the feedthrough hole 210 and the edge of the diaphragm 34 while in the additional orientations.

The method can further comprise comparing the first, second, and any additional offsets to one another and evaluating which of the orientations has the least offset between the center of the feedthrough hole 210 and the edge of the diaphragm 34. The method can further comprise substantially realigning the center of the feedthrough hole 210 with the edge of the diaphragm 34 while in the orientation having the least offset. The method can further comprise bonding (e.g., permanently attaching) the first and second substrates 100, 200 to one another while in the orientation having the least offset (e.g., using thermo-compression bonding of gold by pressing the first and second substrates 100, 200 together with 50 N of force while heating the first and second substrates 100, 200 at 350 degrees Celsius for 4 minutes, forming a metallic bond between the two gold-coated surfaces of the first and second substrates 100, 200; see, e.g., Tsau 2004).

In certain implementations, fabrication of the acoustic sensor 10 further comprises inserting an end of the optical waveguide 20 (e.g., anti-reflection coated bare fiber end of Corning SMF-28 fiber) into the feedthrough hole 210 and attaching the optical waveguide 20 to the second substrate 200. For example, the bonded assembly can be laid on a flat surface with the second substrate 200 facing the optical waveguide 20 that is mounted on a three-axis micro-positioner. The end of the optical waveguide 20 can be aligned to the center of the feedthrough hole 210 and then lowered into the feedthrough hole 210 to an operational distance from the first substrate 100. The waveguide-diaphragm distance can be determined by measuring the free spectral range of the weak interferometer formed by the small reflections at the fiber interface and the strong reflections from the first substrate 100. For example, light from a broadband source (e.g., centered at a wavelength of 1.56 micrometers) can be launched into the optical waveguide 20 through a circulator and towards the first substrate 100 and the reflected light received by the optical waveguide 20 from the first substrate 100 can be redirected towards an optical spectrum analyzer. The waveguide-diaphragm distance can be adjusted until the measured free spectral range is substantially equal to $\Delta\lambda=120$ nanometers, which corresponds to the end of the optical waveguide 20 being 10 micrometers away from the diaphragm 34, which can be an optimal distance corresponding to a good compromise between the power recoupled into the waveguide and lateral tolerance in the power-balance of the PFM interferometer. At this position, the optical waveguide 20 can be bonded to the second substrate 200 (e.g., using about 0.5 µL of a UV curable epoxy). Once cured, this subassembly can be affixed (e.g., clamped) to a housing (e.g., having a 1 cm³ back-chamber with two small holes, one to thread the waveguide to the experimental setup and one to reduce sensitivity to static pressure).

Example Measurements

Figure 5:
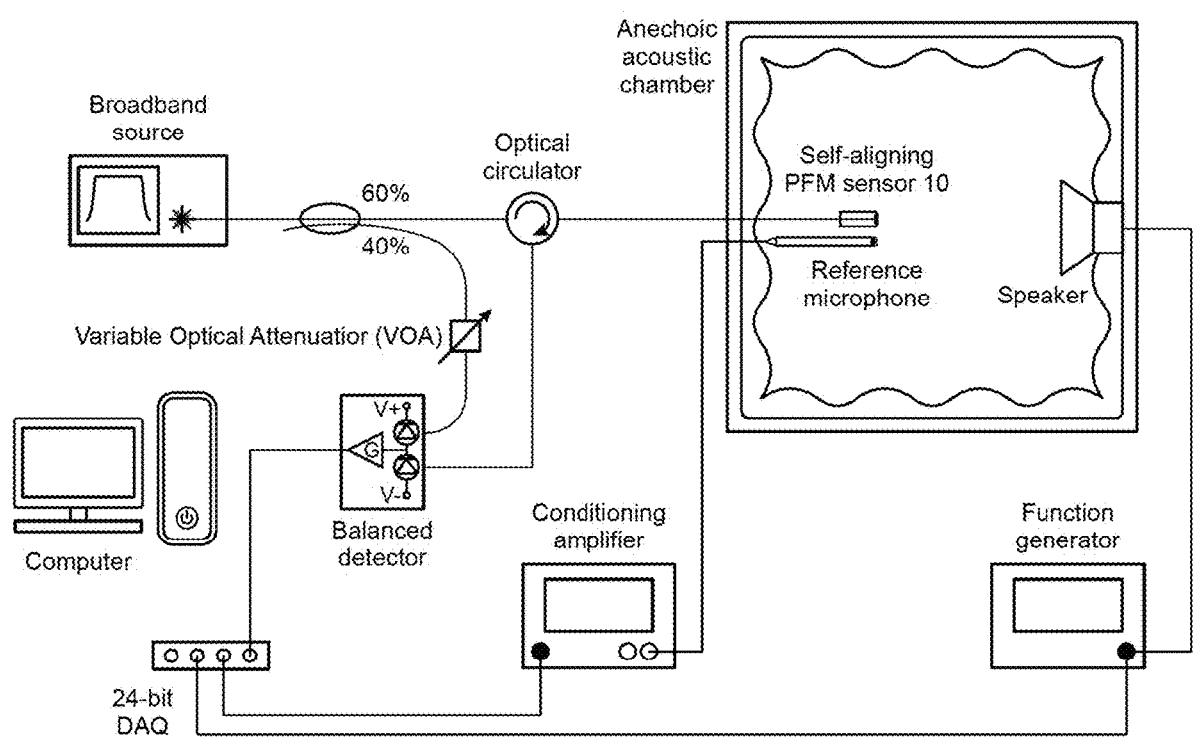
FIG. 5 schematically illustrates an example experimental setup configured to characterize the acoustic sensitivity, noise, and resolution of an acoustic sensor in accordance with certain implementations described herein.

FIG. 5 schematically illustrates an example experimental setup configured to characterize the acoustic sensitivity, noise, and resolution of an acoustic sensor. This example experimental setup was used to characterize acoustic sensors 10 in accordance with certain implementations described herein. A super fluorescent fiber source (SFS), with a center wavelength of $\lambda=1.56$ micrometers and a linewidth of $\Delta\lambda=15$ nanometers was used to probe the acoustic sensor 10 (e.g., to reduce the coherent noise contributions from the weak fiber-chip interferometer). To suppress the excess noise of the broadband light, a balanced detection scheme was employed. Light from the SFS was split with a 60-40 fiber coupler, 60% of the power was sent through a circulator to the acoustic sensor 10, and the remaining 40% was sent to a variable optical attenuator (VOA) then to one of the photodiodes of a balanced detector. The reflected light from the acoustic sensor 10 was directed by the circulator to the second photodiode of the balanced detector. The VOA was adjusted until the same power was incident on both photodiodes. The output of the balanced detector was connected to a 24-bit data acquisition (DAQ) system, which itself was connected to a computer.

The acoustic sensor 10 was placed in an anechoic chamber to isolate the acoustic sensor 10 from laboratory noise. A reference microphone adjacent to the acoustic sensor 10 provided a calibrated measurement of the pressure incident on the acoustic sensor 10. The output of the reference microphone was connected to the DAQ system. The sound measured by both the acoustic sensor 10 and the reference microphone was generated by an acoustic source (e.g., speaker) mounted at the back of the anechoic chamber. The acoustic source was excited by a monotonic sinusoidal signal between 40 Hz to 40 kHz from a function generator controlled by the computer.

Using a detailed model (see, e.g., Afshar 2020) of the normalized acoustic sensitivity of the optical microphone, $S_N$, at an acoustic frequency $\omega_a$ can be defined as the change in the power recoupled into the fiber, $P_c$, due to a small pressure perturbation, dp, normalized to the input optical power, $P_{in}$. The normalized acoustic sensitivity can be expressed as:

$$S_N(\omega_a) = \frac{1}{P_{in}}\frac{dP_c}{dp} = \frac{1}{P_{in}}\frac{dP_c}{dh}\frac{dh}{dp_d}\frac{dp_d(\omega_a)}{dp} = S_{opt}C_m R_a(\omega_a), \quad (1)$$

which is composed of the product of three derivatives. The first derivative is the optical sensitivity, $S_{opt}=d(P_c/P_{in})/dh$, which is the change in power recoupling coefficient, $\eta=P_c/P_{in}$, induced by a small diaphragm displacement, h. The second derivative is the mechanical compliance, $C_m=dh/dp_d$, which describes the displacement dh induced by a small differential pressure, $p_d$, between the diaphragm's front and back surfaces. The third derivative is the acoustic response of the full sensor structure, $R_a(\omega_a)=dp_d(\omega_a)/dp$, which is the change in the differential pressure caused by a small change in the incident pressure p at $\omega_a$. This third derivative is the only term that depends on the acoustic frequency, and this term defines the shape of the acoustic sensor's spectral response.

The optical sensitivity, $S_{opt}$, can be predicted theoretically using diffraction theory (see, e.g., Afshar 2020). The optical sensitivity, $S_{opt}$, is a function of (i) the optical wavelength $\lambda$, (ii) the fiber-to-chip spacing z, (iii) the diaphragm step height $h_0$, (iv) the lateral misalignment between the center of the beam and the edge of the diaphragm g, and (v) the angular misalignment between the fiber and the mechanical chip $\alpha_{tilt}$. Under ideal conditions that produce maximum sensitivity (e.g., $h_0=\lambda/8$, g=0 micrometers, and no tilt), at $\lambda=1.56$ micrometers, and z=10 micrometers, the optical sensitivity can be calculated to be $1.94\times10^6$ m$^{-1}$ (the maximum value shown in FIG. 1B). The mechanical compliance $C_m$ is proportional to the surface area of the diaphragm (e.g., scaling the differential pressure $p_d$) and inversely proportional to the flexibility of the cantilever springs supporting the diaphragm (see, e.g., T. S. D. Senturia, "Microsystem Design," Springer, Ch. 9, 207-217 (2007)). The expression for the mechanical compliance as a function of the number of cantilevers and their dimensions is provided in Afshar 2020. The two sensors described herein were nominally identical. Their parameters are summarized in Table 1, a diaphragm with a radius of 1500 micrometers and cantilevers with a length of 400 micrometers. Their calculated mechanical compliance $C_m$ is 178.5 nm/Pa. Their acoustic response $R_a(\omega_a)$ was calculated by treating the full sensor structure including the 1-cm³ back-chamber as a lumped acoustic circuit model (see, e.g., O. C. Akkaya et al., "Modeling and demonstration of thermally stable high-sensitivity reproducible acoustic sensors," *J. Microelectromech Syst.*, vol. 21, no. 6, 1347-1356 (2012)).

Figure 6:
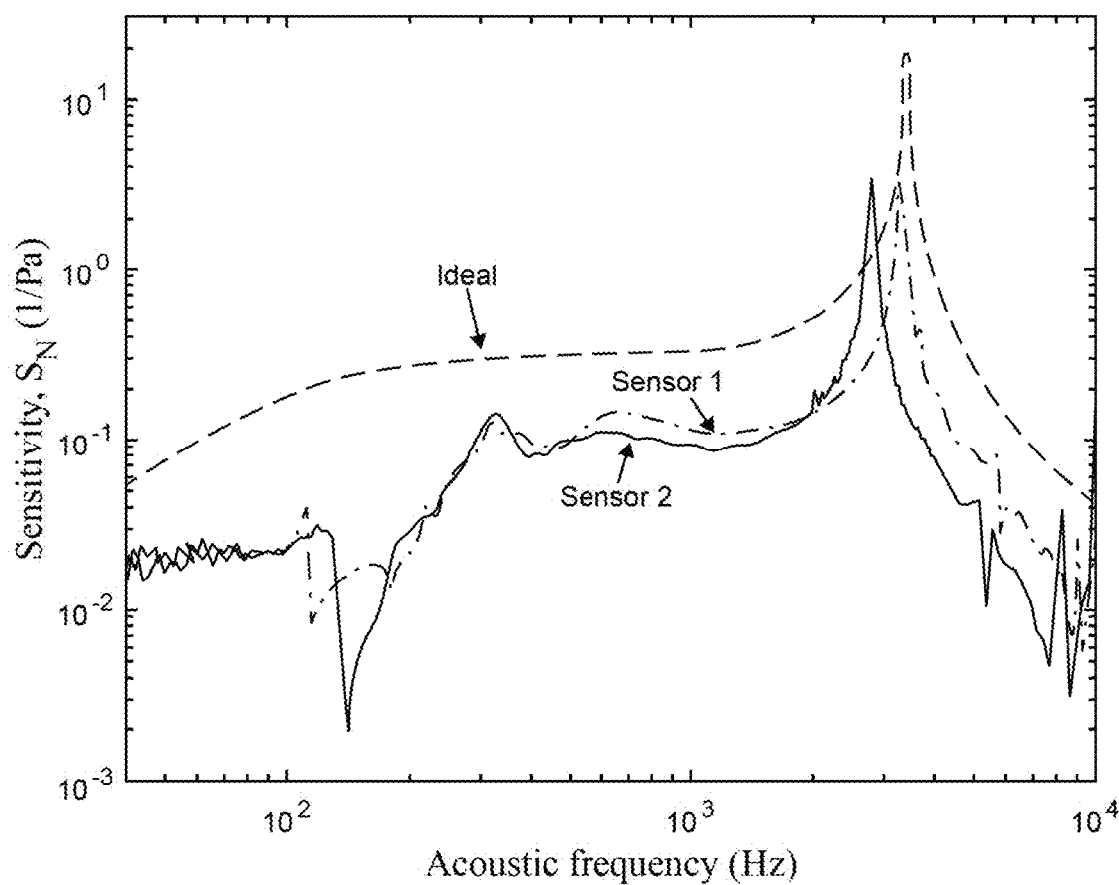
FIG. 6 is a plot of the normalized sensitivity spectrum of an ideal sensor and the normalized sensitivity spectra of two assembled sensors in accordance with certain implementations described herein measured using the measurement setup of FIG. 5.

FIG. 6 is a plot of the normalized sensitivity spectrum of an ideal sensor, calculated for these values. The ideal normalized sensitivity exhibits a flat-band sensitivity of 0.3 Pa$^{-1}$ extending from 90 Hz to 2.4 kHz and a fundamental resonance at 3.3 kHz. Beyond the resonance, the sensitivity decreases proportional to $\omega_a^{-2}$ associated to the response of a simple harmonic oscillator past its resonance. Below 90 Hz, the sensitivity decreases proportional to $\omega_a$, as the vent holes at the end of the back-chamber leak pressure into the chamber and decrease $p_d$.

FIG. 6 also plots the normalized sensitivity $S_N$ spectra of two assembled sensors measured using the measurement setup of FIG. 5. Both sensors exhibit similar sensitivity spectra spanning from 40 Hz to 10 kHz that closely match the general spectral shape of the modeled sensitivity of the ideal sensor. The measured flat-band sensitivity is 0.11 Pa$^{-1}$ between 250 Hz and 2.3 kHz. The fundamental resonance of the diaphragm structure is at 3.2 kHz for sensor 1 and 2.8 kHz for sensor 2. Both sensors exhibit dips in sensitivity between 100 Hz and 250 Hz, which are caused by small air leaks where the bonded chip sub-assembly sits on the housing of the back-chamber. This dip in sensitivity can be avoided by improving the seal between the chips and the housing.

The agreement (to within 15%) between the ideal and measured resonances (see FIG. 6) confirms that the fabricated dimensions of the sensor structure are close to their design values. However, the measured flat-band sensitivity is about 3 times smaller than the ideal sensitivity, mainly due to a lower optical sensitivity $S_{opt}$. The parameters responsible for the reduction of $S_{opt}$ were obtained through a least square fit of the modeled wavelength dependence of both $\eta$, and $S_N$ to their respective measured values, as described herein. A g=2 micrometer lateral offset between the center of the optical beam probing the edge of the diaphragm results in a 1.6-fold reduction in $S_{opt}$. A step height $h_0$ of 130 nanometers rather than 194 nanometers, is responsible for a further 1.3-fold reduction. In addition, power losses, such as angular misalignments and connector losses, account for the remaining 1.4-fold reduction. The path-length mismatch between the two arms of the interferometer is so small (e.g., $\lambda/8$) that a considerable shift in wavelength is used to induce a sizeable change in the interferometer biasing. A ±10% change in optical wavelength (e.g., ±150 nanometers) will only change the sensitivity by ±10%. Probing the sensor with any laser wavelength around the designed value will result in a nearly identical sensitivity.

Figure 7:
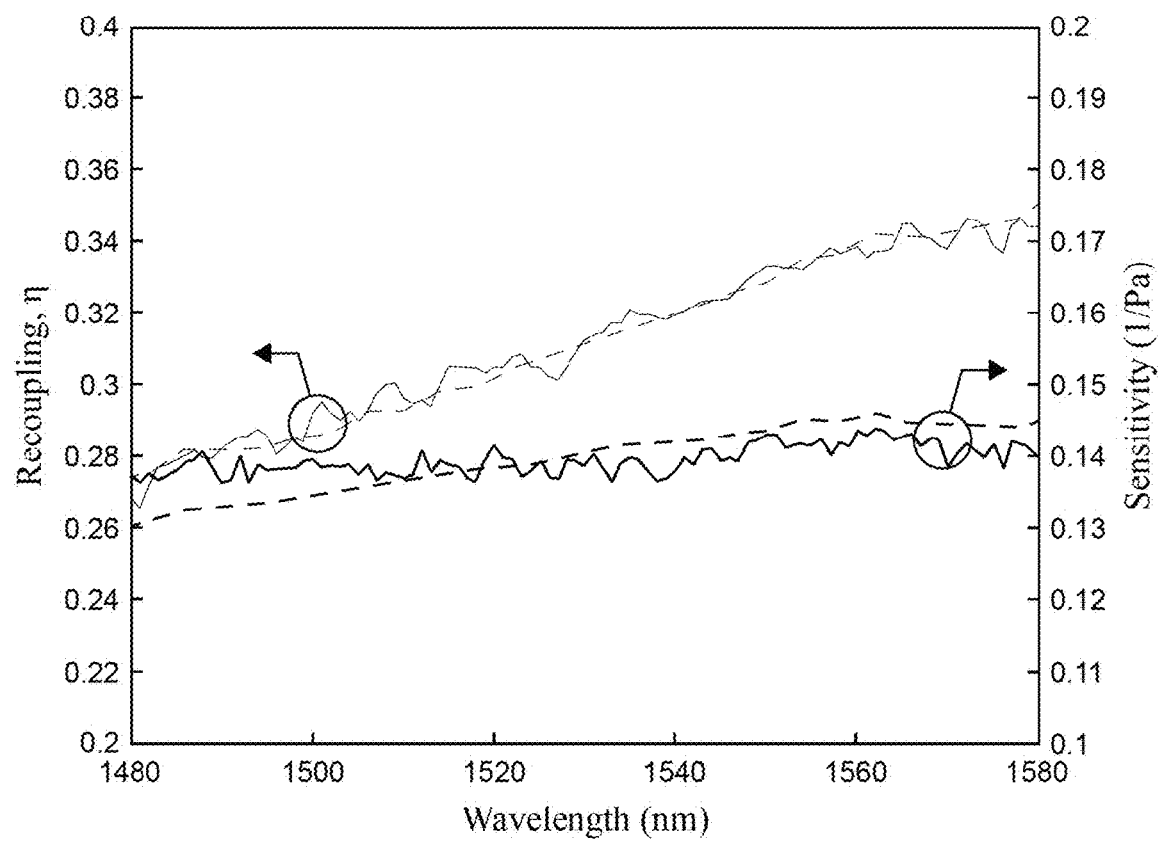
FIG. 7 plots the normalized sensitivity and the power recoupling coefficient of an acoustic sensor measured as a function of the probe wavelength in accordance with certain implementations described herein.

To confirm this feature, the wavelength dependence of the power recoupling and normalized sensitivity were measured. To this end, the broadband SFS in the experimental setup of FIG. 5 was replaced with a tunable laser with a linewidth of 0.8 femtometer. The probing wavelength was swept from 1480 nanometers to 1580 nanometers and the average recoupled power $P_c$ then the sensitivity of sensor 1 to a 100 mPa acoustic excitation at 1 kHz was recorded. FIG. 7 plots the normalized sensitivity and the power recoupling coefficient of sensor 1 measured as a function of the probe wavelength. Varying the wavelength from 1480 nanometers to 1580 nanometers (±3%) resulted in an increase in sensitivity from 0.136 Pa$^{-1}$ to 0.142 Pa$^{-1}$, a ±2.2% change only. Similarly, the power recoupling coefficient $\eta$ increases from 27% to 35%.

The measured $\eta$ and $S_N$ were fitted to their respective models (see, Afshar 2020) to infer the values of five sensor parameters: (i) the diaphragm step height $h_0$, (ii) the lateral misalignment between the beam and the diaphragm g, (iii) the power loss due to the angular misalignment $\alpha_{tilt}$, (iv) the fiber-to-chip spacing z, and (v) the mechanical response at 1 kHz $C_m \times R_a(1 \text{ kHz})$. There is an excellent agreement between the modeled values (shown as dashed curves) and the measured $\eta$ and $S_N$ (shown as solid curves). As a result, the fitted parameters can be taken as a credible representation of the sensor parameters. The fitted parameters are $h_0$=130 nanometers (194 nanometers ideally), g=2 micrometers (0 micrometers ideally), $\alpha_{tilt}$=0.8 (1 ideally), z=4 micrometers (10 micrometers ideally), and $C_m \times R_a(1 \text{ kHz})$ =187 nm/Pa (178.5 nm/Pa ideally). The fitted parameters are reasonably close to their targeted ideal values.

Figure 8A:
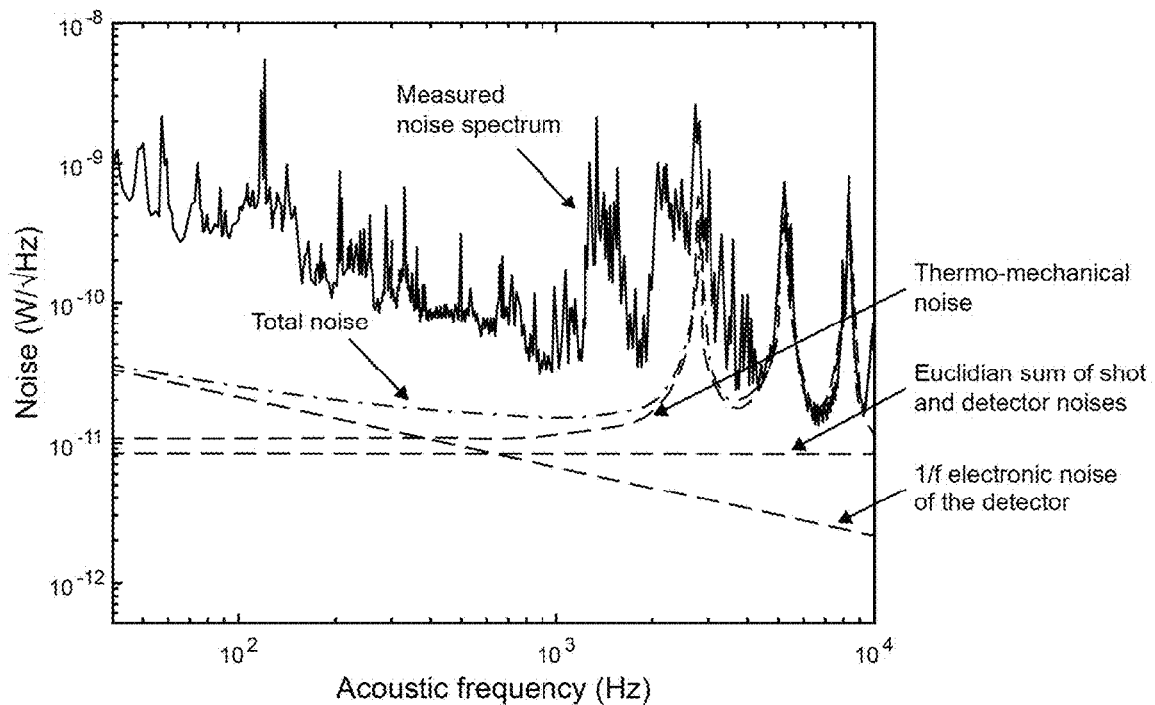
FIGS. 8A and 8B plot the noise spectral density (in $W/\sqrt{Hz}$) of an acoustic sensor as a function of acoustic frequency measured at 760 Torr and 100 Torr, respectively, in accordance with certain implementations described herein.
Figure 8B:
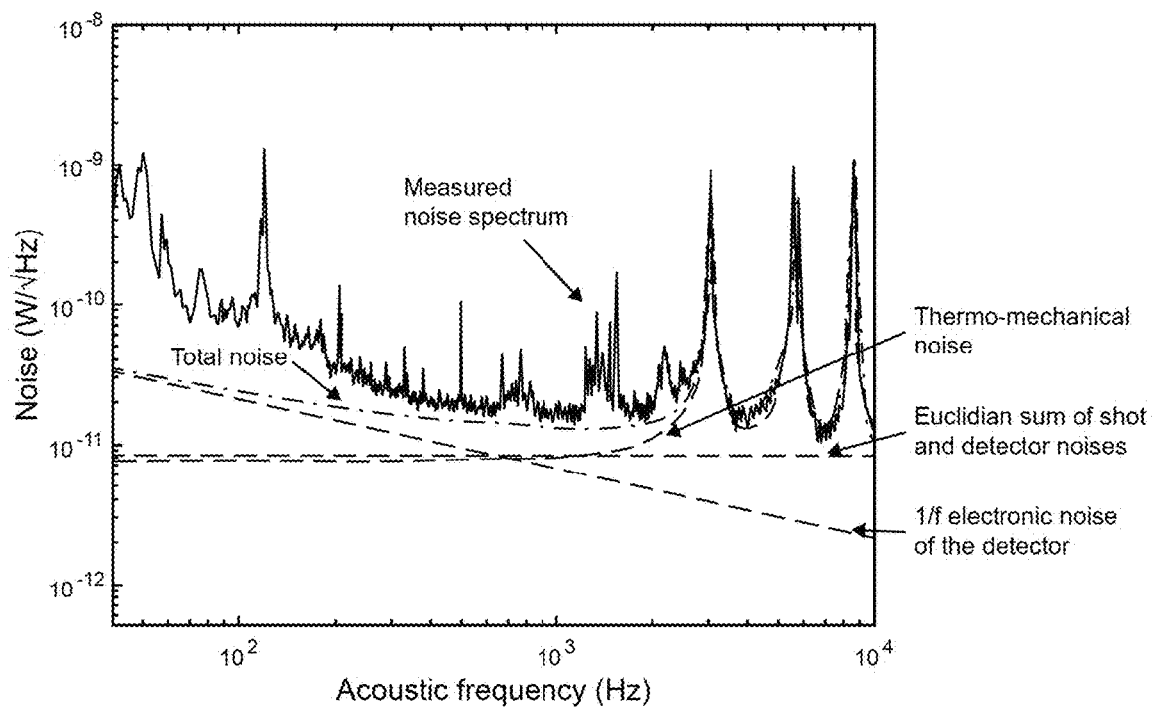

The sensors were suspended inside a vacuum chamber and their noise was characterized at 760 Torr and 100 Torr. The vacuum chamber offered better acoustic isolation from ambient vibrations compared to the anechoic chamber of FIG. 5. FIGS. 8A and 8B plot the noise spectral density (in W/√Hz) of sensor 2 as a function of acoustic frequency measured at 760 Torr and 100 Torr, respectively. The measured noise tends to decrease from 40 Hz up to 1 kHz, then increases in four sets of resonances centered around 1.5 kHz, 3 kHz, 5.3 kHz, and 8.3 kHz.

The individual contributions to the total noise of the sensor are detector noise, optical shot noise, thermo-mechanical noise, 1/f electronic noise and the ambient noise leaking into the chambers. The detector noise was measured to be 0.8 pW/√Hz from 40 Hz to 10 kHz. The optical shot noise was calculated to be 7 pW/√Hz based on an average detected power of 73 µW incident on each of the two diodes of the balanced detector. FIGS. 8A and 8B also plot the Euclidean sum of the shot and detector noises and a 1/f electronic noise of the detector that is manifested as 1/√f in the plot of optical power density. The ambient noise leaking into the chamber is hard to incorporate as a model and inferred by comparing the measured noise of sensor 2 at the two static pressures of 760 Torr (FIG. 8A) and 100 Torr (FIG. 8B). The only other remaining noise contribution is the thermo-mechanical noise.

The thermo-mechanical noise is the stochastic vibrations of the diaphragm structure due to its thermodynamic interaction with the surrounding medium to reach thermal equilibrium (see, e.g., P. R. Saulson, "Thermal noise in mechanical experiments," *Phys. Rev. D*, vol. 42, no. 8, 2437-2445 (1990)). These random diaphragm vibrations modulate the phase of light reflected from the diaphragm that result in an intensity modulation of the recoupled light into the fiber. A simple model of the thermo-mechanical noise can be considered where the diaphragm structure is modeled as a multi-mode harmonic oscillator with orthogonal resonant modes $\psi_i$. Fluctuation-dissipation theorem can be applied to each resonant mode and the overall thermo-mechanical noise can be calculated as the Euclidean sum of the thermal noise in each orthogonal mode (see, e.g., Saulson 1990):

$$N_{th}(\omega_a) = P_{in} S_{opt} \times \sqrt{\frac{4K_B T}{m^2} \sum_{i=0}^{\infty} \frac{\psi_i^2 c_i}{(\omega_i^2 - \omega^2)^2 + (\omega c_i/m)^2}},$$

where $K_B$ is the Boltzmann's constant, T is ambient temperature, m is the mass of the diaphragm, $\omega_i$ is the $i^{th}$ resonance mode of the diaphragm with a displacement mode $\psi_i$ at the edge where the fiber is probing its motion, and $c_i$ is the damping coefficient of the $i^{th}$ resonance mode. The displacement mode $\psi_i$ is normalized such that $\langle\psi_i|\psi_j\rangle=\delta_{ij}$. The modeled thermo-mechanical noise of sensor 2 is plotted in FIGS. 8A and 8B, incorporating the first three resonances of the diaphragm structure at 2.8 kHz, 5.3 kHz, and 8.3 kHz. The mass of the diaphragm was calculated based on its physical dimensions. The displacement ratio $\psi_i$ for each resonance mode was modeled numerically. The only remaining unknown parameters were the damping coefficients $c_i$. The damping coefficient of the fundamental resonance mode, $c_i$, was inferred by fitting the measured sensitivity spectrum of FIG. 6 with the model of a simple harmonic oscillator. The remaining values of $c_i$ were inferred based on the width of the subsequent resonance modes of the measured noise spectrum.

FIGS. 8A and 8B also plot the total expected noise of sensor 2. The measured noise is in good agreement with the expected noise above 4.4 kHz, where it is predominantly limited by the calculated thermo-mechanical noise. Between 40 Hz to 4.4 kHz, the measured noise is on average nine times higher than the expected noise and likely dominated by ambient acoustic vibrations leaking into the chamber. To confirm the sensor is limited by ambient noise and not by internal thermal noises, the pressure inside the vacuum chamber was reduced to 100 Torr. Doing so reduces the transmission of the acoustic noise by the ratio of the two pressures (about 7.6) without substantially reducing damping around the spring-loaded diaphragm, which depends weakly on pressure, near atmospheric pressures (see, e.g., F. R. Blom et al, "Dependence of the quality factor of micromachined silicon beam resonators on pressure and geometry," *J. Vac. Sci. Technol. B*, vol. 10, no. 1, 19-26 (1992)). FIG. 8B demonstrates the measured and calculated noise spectra of sensor 2 at 100 Torr to be in good agreement from 200 Hz to 10 kHz. Between 40 Hz to 2.5 kHz, the measured noise is eight times lower than the noise at 760 Torr, and the fitted damping coefficients and thermo-mechanical noise (7.5 pW/$\sqrt{Hz}$) are within 50% of their respective values at 760 Torr (10.6 pW/$\sqrt{Hz}$). Thus, all noises are accounted for and the sensor is ambient-noise limited at 760 Torr.

Figure 9:
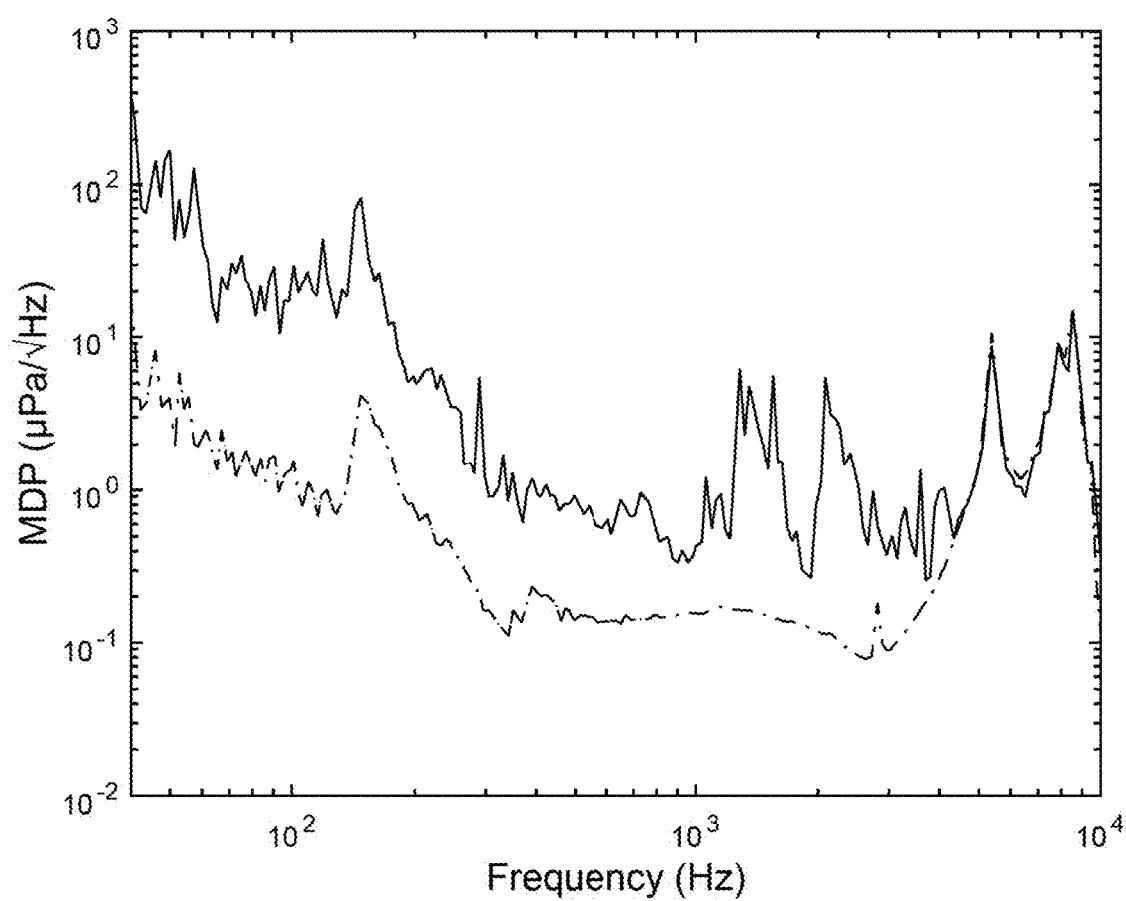
FIG. 9 plots the measured MDP of an acoustic sensor for an input power of 1.2 mW in accordance with certain implementations described herein.

The minimum detectable pressure (MDP), equivalent to a signal-to-noise ratio of unity, can be calculated by dividing the measured noise spectrum at 760 Torr (normalized by the input power) by the sensitivity spectrum. FIG. 9 plots the measured MDP of sensor 2 for an input power of 1.2 mW. The MDP decreases from 200 µPa/$\sqrt{Hz}$ to 360 nPa/$\sqrt{Hz}$ between 40 Hz and 1 kHz, followed by two hikes to 6 µPa/$\sqrt{Hz}$ between 1.2 kHz and 2.6 kHz, and increases beyond 4 kHz. The average measured MDP between 40 Hz and 4 kHz is 2.4 µPa/$\sqrt{Hz}$ and the minimum measured MDP of the sensor is 260 nPa/$\sqrt{Hz}$ at 1.9 kHz and 3.7 kHz. The measured MDP is limited by ambient noise of the chamber and is not a true reflection of the sensor's self-noise. The expected MDP based on the sensor self-noise can be calculated as the ratio of the total expected noise (e.g., plotted in FIGS. 8A and 8B) to the measured sensitivity (e.g., plotted in FIG. 6). For sensor 2, the average expected MDP is 215 nPa/$\sqrt{Hz}$ between 40 Hz and 4 kHz reaching a minimum of 80 nPa/$\sqrt{Hz}$ at 2.6 kHz.

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It is to be appreciated that the implementations disclosed herein are not mutually exclusive and may be combined with one another in various arrangements. In addition, although the disclosed methods and apparatuses have largely been described in the context of various devices, various implementations described herein can be incorporated in a variety of other suitable devices, methods, and contexts.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," "less than," "between," and the like includes the number recited. As used herein, the meaning of "a," "an," and "said" includes plural reference unless the context clearly dictates otherwise. Also, as used in the description herein, the meaning of "in" includes "into" and "on," unless the context clearly dictates otherwise.

While the methods and systems are discussed herein in terms of elements labeled by ordinal adjectives (e.g., first, second, etc.), the ordinal adjective are used merely as labels to distinguish one element from another (e.g., one signal from another or one circuit from one another), and the ordinal adjective is not used to denote an order of these elements or of their use.

The invention described and claimed herein is not to be limited in scope by the specific example implementations herein disclosed, since these implementations are intended as illustrations, and not limitations, of several aspects of the invention. Any equivalent implementations are intended to be within the scope of this invention. Indeed, various modifications of the invention in form and detail, in addition to those shown and described herein, will become apparent to those skilled in the art from the foregoing description. Such modifications are also intended to fall within the scope of the claims. The breadth and scope of the invention should not be limited by any of the example implementations disclosed herein but should be defined only in accordance with the claims and their equivalents.

What is claimed is:

1. An acoustic sensor comprising:
   at least one optical waveguide configured to emit an optical beam;
   a substantially planar first substrate optically coupled to the at least one optical waveguide, the first substrate configured to be illuminated by the optical beam and to reflect at least a portion of the optical beam to the at least one optical waveguide, the first substrate comprising:
   a first substrate portion configured to reflect a first portion of the optical beam back to the at least one optical waveguide; and
   a diaphragm configured to reflect, at an edge of the diaphragm, a second portion of the optical beam back to the at least one optical waveguide, the diaphragm responsive to a perturbation by moving relative to the first substrate portion, the optical beam centered on a region between the first substrate portion and the diaphragm; and a substantially planar second substrate affixed to the first substrate and affixed to the at least one optical waveguide, the second substrate substantially parallel to the first substrate.

2. The acoustic sensor of claim 1, wherein the second substrate comprises a feedthrough hole extending through the second substrate and configured to receive the optical waveguide.

3. The acoustic sensor of claim 2, wherein the optical waveguide is fixed within the feedthrough hole such that an end of the optical waveguide is spaced from the first substrate and positioned such that the optical beam is emitted from the end of the optical waveguide and propagates substantially perpendicularly to the first substrate, and light reflected from the diaphragm and the first substrate portion propagates substantially perpendicularly to the first substrate back to the end of the optical waveguide.

4. The acoustic sensor of claim 3, wherein the first substrate comprises at least one alignment island and the second substrate comprises at least one alignment well, the at least one alignment island configured to fit within the at least one alignment well to fix relative positions of the diaphragm of the first substrate and the feedthrough hole of the second substrate.

5. The acoustic sensor of claim 4, wherein a perimeter of the at least one alignment island has a step edge such that the at least one alignment island has a height above a surface of a region of the first substrate substantially surrounding the at least one alignment island and a perimeter of the at least one alignment well has a depth below a surface of a region of the second substrate substantially surrounding the at least one alignment well, the height less than the depth.

6. The acoustic sensor of claim 4, wherein the at least one alignment island has a first width and the at least one alignment well has a second width, the first width less than the second width.

7. The acoustic sensor of claim 4, wherein the at least one alignment island comprises at least one alignment ledge extending from a perimeter of the at least one alignment island and the at least one alignment well comprises at least one alignment notch extending from a perimeter of the at least one alignment well.

8. The acoustic sensor of claim 7, wherein the at least one alignment island comprises a single alignment island having a single substantially rectangular alignment ledge extending substantially perpendicularly to the perimeter of the alignment island and the at least one alignment well comprises a single alignment well having four substantially rectangular alignment notches positioned equidistantly around the alignment well.

9. The acoustic sensor of claim 1, wherein the first substrate and the second substrate comprise complementary mating structures configured to facilitate alignment of the optical waveguide with an edge of the diaphragm.

10. The acoustic sensor of claim 1, wherein the second substrate further comprises one or more orifices configured to allow a fluid medium to flow out from a region between the first substrate and the second substrate.

11. A method of fabricating an acoustic sensor, the method comprising:
fabricating a substantially planar first substrate comprising a first substrate portion and a diaphragm, the diaphragm configured to move relative to the first substrate portion in response to an acoustic perturbation;

fabricating a substantially planar second substrate, the second substrate comprising a feedthrough hole and a plurality of orifices configured to allow a fluid medium to flow out from a region between the first substrate and the second substrate during operation of the acoustic sensor;

aligning the first substrate and the second substrate to one another such that the feedthrough hole is aligned over a region between the first substrate portion and the diaphragm; and affixing the first substrate and the second substrate to one another such that the second substrate is substantially parallel to the first substrate.

12. The method of claim 11, wherein said fabricating the substantially planar first substrate comprises thinning a device layer using thermal oxidation, using deep reactive ion etching to form the diaphragm, releasing the diaphragm, and coating the device layer with an adhesion layer and a reflective layer.

13. The method of claim 11, wherein said fabricating the substantially planar second substrate comprises using deep reactive ion etching to form a plurality of lines tracing perimeters of the plurality of orifices.

14. The method of claim 13, wherein said fabricating the substantially planar second substrate further comprises using deep reactive ion etching to form etch patterns configured to substantially reduce asymmetry in electric fields at a surface of the second substrate in proximity of the feedthrough hole that would otherwise occur during deep reactive ion etching to form the plurality of orifices.

15. The method of claim 11, wherein said aligning the first substrate and the second substrate to one another comprises:
placing the first and second substrates in a plurality of rotational orientation relative to one another;
substantially aligning a center of the feedthrough hole with an edge of the diaphragm while the first and second substrates are in each rotational orientation of the plurality of rotational orientations;
measuring an offset between the center of the feedthrough hole and the edge of the diaphragm while the first and second substrates are in each rotational orientation of the plurality of rotational orientations; and
comparing the offsets to one another and evaluating which of the rotational orientations has the least offset between the center of the feedthrough hole and the edge of the diaphragm.

16. The method of claim 15, wherein said affixing the first substrate and the second substrate to one another comprises:
substantially realigning the center of the feedthrough hole with the edge of the diaphragm while in the first substrate and the second substrate are in the rotational orientation having the least offset; and
bonding the first and second substrates to one another while in the first substrate and the second substrate are in the rotational orientation having the least offset.

17. The method of claim 15, wherein said aligning the first substrate and the second substrate to one another comprises using a flip-chip bonder.

18. The method of claim 11, further comprising inserting an end of an optical waveguide into the feedthrough hole and attaching the optical waveguide to the second substrate.

19. The method of claim 18, wherein said inserting comprises aligning the end of the optical waveguide to the center of the feedthrough hole and moving the end into the feedthrough hole to an operational distance from the first substrate.

20. The method of claim 19, further comprises determining a waveguide-diaphragm distance by measuring a free spectral range of weak interferometry between reflections at the end and reflections from the first substrate.

\* \* \* \* \*